United States Patent
Christensen

(10) Patent No.: US 11,782,486 B2
(45) Date of Patent: Oct. 10, 2023

(54) CREATIVE STAND

(71) Applicant: Cross Arc, LLC, Salt Lake City, UT (US)

(72) Inventor: Jonah Christensen, Salt Lake City, UT (US)

(73) Assignee: Cross Arc, LLC, Salt Lake City, UT (US)

( * ) Notice: Subject to any disclaimer, the term of this patent is extended or adjusted under 35 U.S.C. 154(b) by 176 days.

(21) Appl. No.: 17/483,067

(22) Filed: Sep. 23, 2021

(65) Prior Publication Data

US 2022/0091631 A1    Mar. 24, 2022

Related U.S. Application Data

(60) Provisional application No. 63/082,037, filed on Sep. 23, 2020.

(51) Int. Cl.
| | | |
|---|---|---|
| *G06F 1/16* | (2006.01) | |
| *F16M 13/02* | (2006.01) | |
| *F16M 11/38* | (2006.01) | |

(52) U.S. Cl.
CPC ............ *G06F 1/166* (2013.01); *F16M 11/38* (2013.01); *F16M 13/022* (2013.01); *F16M 2200/024* (2013.01); *F16M 2200/08* (2013.01)

(58) Field of Classification Search
CPC .................................................... G06F 1/166
See application file for complete search history.

(56) References Cited

U.S. PATENT DOCUMENTS

| | | | |
|---|---|---|---|
| 4,155,477 A | 5/1979 | Fosher | |
| 5,348,263 A | 9/1994 | Hubbard | |
| 5,655,743 A | 8/1997 | Gillis | |
| 5,692,815 A * | 12/1997 | Murphy | ............... G06F 3/0395 |
| | | | 312/231 |
| 5,732,910 A | 3/1998 | Martin | |
| 5,901,934 A | 5/1999 | Wilson | |
| 6,003,446 A | 12/1999 | Leibowitz | |
| 6,234,085 B1 | 5/2001 | Ramundo | |
| 6,382,745 B1 | 5/2002 | Adkins | |
| 6,439,133 B1 | 8/2002 | Jaramillo | |
| (Continued) | | | |

FOREIGN PATENT DOCUMENTS

| | | |
|---|---|---|
| CN | 103445495 A | 12/2013 |
| CN | 105589076 A | 5/2016 |
| (Continued) | | |

*Primary Examiner* — Monica E Millner
(74) *Attorney, Agent, or Firm* — Kunzler Bean & Adamson; Bruce R. Needham

(57) ABSTRACT

An apparatus includes a front panel that includes a front slot along an edge of the front panel and a back panel fixedly coupled to the front panel. The back panel includes a back slot along an edge of the back panel. The front slot and back slot align. A side panel is configured to fold into a gap between the front panel and the back panel, and a pivot coupling at a corner of the side panel. The pivot coupling is slidably coupled to the front and back slots. The corner of the side panel slidably moves along the front and back slots via the pivot coupling, and the side panel is movable from a stowed position in the gap to an open position to the side of the front and back panels by rotating the side panel and moving the pivot coupling along the front and back slots.

20 Claims, 17 Drawing Sheets

(56) References Cited

U.S. PATENT DOCUMENTS

| | | | |
|---|---|---|---|
| 6,497,391 B1* | 12/2002 | Timm | A47B 21/0314 108/50.01 |
| 6,507,483 B2* | 1/2003 | Oura | A47B 21/0371 361/679.19 |
| 6,529,369 B1 | 3/2003 | Zarek et al. | |
| 6,682,038 B2* | 1/2004 | Golynsky | A47B 21/0314 248/118 |
| 6,757,159 B2* | 6/2004 | Zarek | G06F 1/169 361/679.55 |
| 6,947,026 B2* | 9/2005 | Mattson | G06F 3/0395 345/163 |
| 7,150,236 B1 | 12/2006 | Riley | |
| 7,296,523 B1* | 11/2007 | Yoon | A47B 95/00 108/103 |
| 7,311,354 B2 | 12/2007 | Giasson | |
| 9,380,847 B1* | 7/2016 | Killebrew | A45C 9/00 |
| 9,573,687 B2 | 2/2017 | Stephens et al. | |
| 9,924,805 B2* | 3/2018 | Cass | A47C 31/00 |
| 10,114,412 B1 | 10/2018 | Braham | |
| 2004/0261175 A1* | 12/2004 | May | A47C 7/62 5/503.1 |
| 2005/0206283 A1* | 9/2005 | Stiles | G06F 3/0395 312/330.1 |
| 2011/0056412 A1* | 3/2011 | Grammer | A45C 9/00 108/1 |
| 2018/0275717 A1 | 9/2018 | Ram | |
| 2019/0061953 A1 | 2/2019 | Fishel et al. | |

FOREIGN PATENT DOCUMENTS

| | | |
|---|---|---|
| DE | 202007008339 U1 | 9/2007 |
| EP | 0960768 A2 | 1/1999 |
| GB | 855460 A | 11/1960 |
| GB | 2460757 A | 12/2009 |

* cited by examiner

CREATIVE STAND

CROSS-REFERENCES TO RELATED APPLICATIONS

This application claims the benefit of U.S. Provisional Patent Application No. 63/082,037 entitled "Creative Stand" and filed on Sep. 23, 2020 for Jonah Christensen, which is incorporated herein by reference.

FIELD

This invention relates to work stands and more particularly relates to a creative stand with a side panel that folds out from a gap between a front panel and a back panel.

BACKGROUND

Often work on a tablet computer laptop computer, etc. is inconvenient without some surface to support the computer. Also, while in a car, traveling, or another location without a desk, table, etc., it is often inconvenient to work using a notebook or even a piece of paper without some type of convenient support.

SUMMARY

An apparatus for a creative stand is disclosed. The apparatus includes a front panel that includes a front slot along an edge of the front panel and a back panel fixedly coupled to the front panel. The back panel includes a back slot along an edge of the back panel where the front slot and back slot align. The apparatus includes a side panel configured to fold into a gap between the front panel and the back panel, and a pivot coupling at a corner of the side panel. The pivot coupling is slidably coupled to the front and the back slots. The corner of the side panel slidably moves along the front and back slots via the pivot coupling, and the side panel is movable from a stowed position in the gap to an open position to the side of the front and back panels by rotating the side panel and moving the pivot coupling along the front and back slots.

Another apparatus for a creative stand includes a front panel with two front slots along opposite edges of the front panel. The front panel includes a hole near each corner of the front panel. The apparatus includes a back panel with two back slots along opposite edges of the back panel. The back panel includes a hole near each corner of the back panel. The front slots and back slots align and the holes in the corners of the front and back panels align. The apparatus includes a plurality of openings positioned along the edges of the front and back panels without the front and back slots. The openings are configured to accommodate connectors for accessories. The apparatus includes a side panel sized to fold into a gap between the front panel and the back panel. The side panel includes a hole near each corner of the side panel. The apparatus includes a pivot coupling positioned in a hole of the side panel. The pivot coupling is slidably coupled to a pair of aligned front and the back slots of the two of front and back slots. The corner of the side panel slidably moves along the pair of aligned front and back slots via the pivot coupling, and the side panel is movable from a stowed position in the gap to an open position to the side of the front and back panels by rotating the side panel and moving the pivot coupling along the pair of aligned front and back slots.

Another apparatus for a creative stand includes a front panel with a front slot along an edge of the front panel, and a back panel fixedly coupled to the front panel, where the back panel includes a back slot along an edge of the back panel. The front slot and back slot align. The apparatus includes a side panel configured to fold into a gap between the front panel and the back panel. The apparatus includes a pivot coupling at a corner of the side panel. The pivot coupling is slidably coupled to the front and the back slots. The corner of the side panel slidably moves along the front and back slots via the pivot coupling and the side panel is movable from a stowed position in the gap to an open position to the side of the front and back panels by rotating the side panel and moving the pivot coupling along the front and back slots. The apparatus includes at least two anchor couplings extending through the front and back panels. Each anchor coupling is positioned near a corner of the front and back panels. At least one anchor coupling of the at least two anchor couplings is positioned at an end of and in line with the front and back slots. The apparatus includes a first anchor slot positioned near a corner of the side panel with the pivot coupling. The first anchor slot is configured to slide over the anchor coupling while the side panel is in the stowed position. The apparatus includes a second anchor slot positioned in an edge of the side panel opposite the edge of the side panel with the pivot coupling. The second anchor slot is configured to slide over the anchor coupling and to fix the side panel with respect to the front and back panels when the side panel is in the open position.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
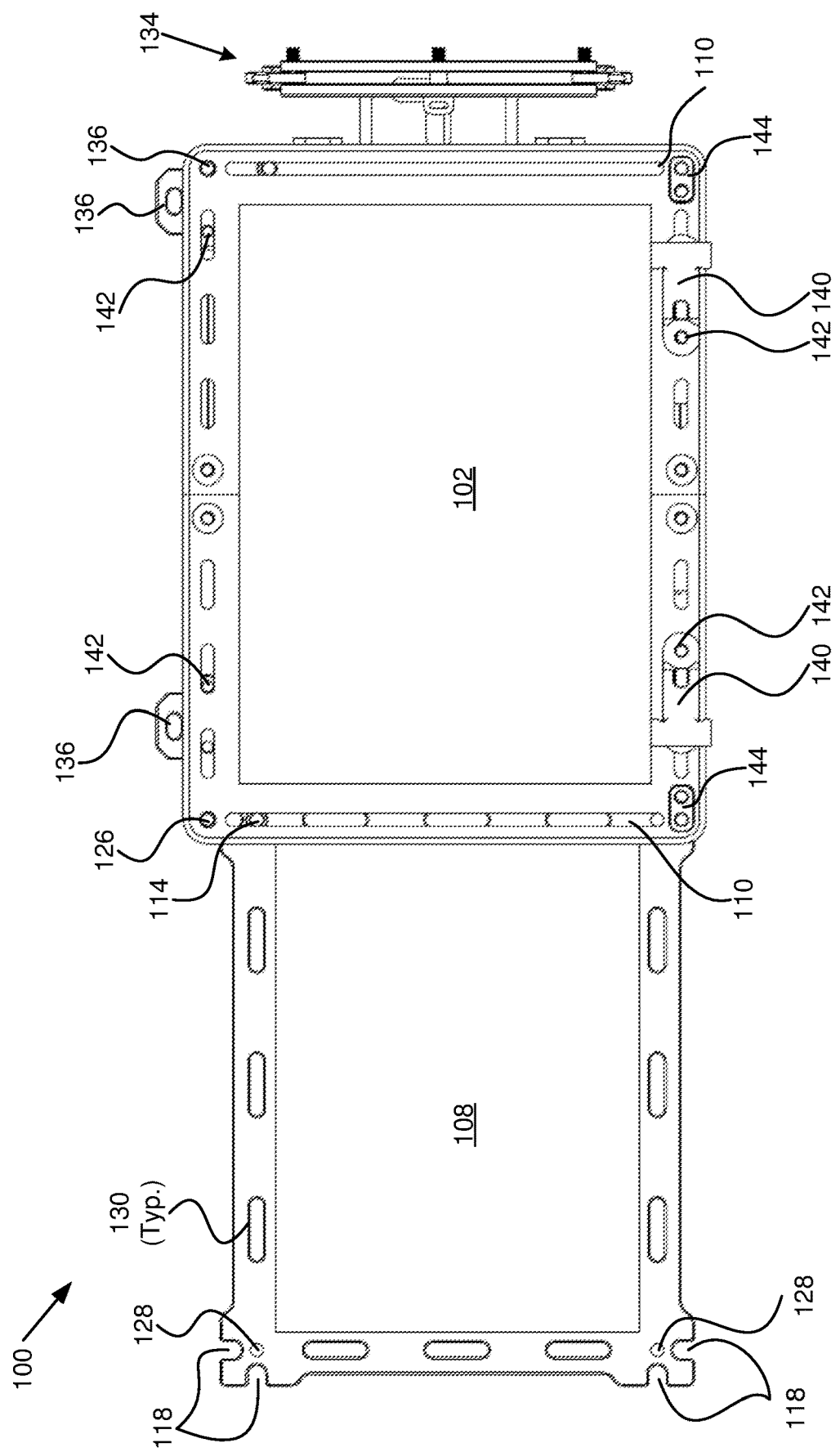
FIG. 1 is a front view illustrating one embodiment of a creative stand with a side panel extended.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for a creative stand is disclosed. The apparatus includes a front panel that includes a front slot along an edge of the front panel and a back panel fixedly coupled to the front panel. The back panel includes a back slot along an edge of the back panel where the front slot and back slot align. The apparatus includes a side panel configured to fold into a gap between the front panel and the back panel, and a pivot coupling at a corner of the side panel. The pivot coupling is slidably coupled to the front and the back slots. The corner of the side panel slidably moves along the front and back slots via the pivot coupling, and the side panel is movable from a stowed position in the gap to an open position to the side of the front and back panels by rotating the side panel and moving the pivot coupling along the front and back slots.

In some embodiments, the apparatus includes an anchor coupling positioned at an end of the front and back slots and extending through the front and back panels, and a first anchor slot positioned near a corner of the side panel with the pivot coupling. The first anchor slot is configured to slide over the anchor coupling while the side panel is in the stowed position. The apparatus includes a second anchor slot positioned near a corner of the side panel opposite of the corner with the pivot coupling, the second anchor slot is configured to slide over the anchor coupling and to fix the side panel with respect to the front and back panels when the side panel is in the open position. In further embodiments, the first anchor slot is in a first edge of the side panel and the second anchor slot is in a second edge of the side panel opposite to the first edge.

In other embodiments, when the side panel is in the open position, the side panel is anchored by the second anchor slot over the anchor coupling and the pivot coupling in the front and back slots at a position opposite an end of the front and back slots near the anchor coupling. In other embodiments, the apparatus includes a panel lock positioned to engage a third anchor slot in the side panel when the side panel is in the stowed position. The third anchor slot is located near a corner of the side panel different from the corner near the pivot coupling. The panel lock is movable between a locked position engaging the third anchor slot and an unlocked position disengaging the third anchor slot. In other embodiments, the apparatus includes a panel brace configured to fit in the gap and to prevent the side panel from moving past a position aligning the third anchor slot with the panel lock.

In some embodiments, the side panel is a first side panel, the front slot is a first front slot, the back slot is a first back slot, and the pivot coupling is a first pivot coupling, and the apparatus includes a second front slot along an edge the front panel opposite the edge of the front panel with the first front slot, a second back slot along an edge the back panel opposite the edge of the back panel with the first back slot. The second front slot and the second back slot align. In the embodiments, the apparatus includes a second side panel configured to fold into the gap between the front panel and the second panel, and a second pivot coupling at a corner of the second side panel. The second pivot coupling is slidably coupled to the second front slot and the second back slot. The corner of the second side panel slidably moves along the second front slot and the second back slot via the second pivot coupling, and the second side panel is movable from a stowed position in the gap to an open position to the side of the front and back panels by rotating the second side panel and moving the second pivot coupling along the second front slot and the second back slot.

In some embodiments, the front panel includes a planar surface facing away from the gap and the side panel includes a planar surface facing a same direction as the planar surface of the front panel. In other embodiments, the planar surface of the front panel and/or the planar surface of the back panel comprise a dry erase writing surface. In other embodiments, the front slot is a first front slot, the back slot is a first back slot, and the apparatus includes a hole through each corner of the front panel and a hole through each corner of the back panel. The holes in the front panel align with the holes in the back panel, each forming a hole pair. In the embodiments, the apparatus includes a hole through each corner of the side panel, anchor couplings detachably coupling two or more hole pairs of the front and back panels, where the anchor couplings maintaining the gap between the front and back panels, a second front slot positioned along an edge of the front panel opposite the edge adjacent to the first front slot, and a second back slot positioned along an edge of the back panel opposite the edge adjacent to the first back slot. The second front slot aligns with the second back slot. The pivot coupling is positionable in any of the holes in the side panel and in any of the aligned front and back slots, and the anchor couplings are positionable in any of the hole pairs.

In further embodiments, the apparatus includes a pair of anchor slots near each corner of the side panel, where for a corner of the side panel, a line intersecting a first anchor slot of a pair of anchor slots at the corner and the hole near the corner is orthogonal to a line intersecting a second anchor slot of the pair of anchor slots at the corner and the hole near the corner. The pivot coupling is positioned in a hole in the side panel and is slidably coupled to a front slot of the first and second of front slots and the corresponding back slot. A first anchor slot of the pair of anchor slots adjacent to the pivot coupling is configured to slide over an anchor coupling adjacent at a location in line with the front and back slots of the two front and back slots where the pivot coupling is positioned while the side panel is in the stowed position, and an anchor slot in an edge opposite the edge with the first anchor slot is configured to slide over the anchor coupling adjacent to the front and back slots where the pivot coupling is positioned while the side panel is in the open position. In further embodiments, the apparatus includes a plurality of accessory slots positioned adjacent to edges of the front panel and/or back panel without front slots and back slots. The accessory slots are configured to couple to additional accessories.

In some embodiments, the apparatus includes a cell phone holder coupled to a side of the front and back panels opposite the front and back slots where the pivot coupling is engaged. The cell phone holder is detachably couplable to a cell phone. In other embodiments, the apparatus includes a foldable back stand coupled to the back panel. The back stand is movable between a stowed position against the back panel and an open position configured to support the apparatus in an upright position. In other embodiments, the apparatus includes a handle/steering wheel coupling that is configured to couple the apparatus to a steering wheel. In other embodiments, the apparatus includes one or more extendable supports positioned along an edge of the front panel adjacent to the edge of the front and back panel comprising the front and back slots. The extendable supports are operable to move between a closed position where the extendable supports are close to the front panel and an open position where the extendable supports are positioned away from the front panel and are configured to support a device placed on the front panel when the front panel is in an upright position. In other embodiments, the apparatus includes accessory slots on the back panel and straps inserted in the accessory slots. The straps are configured to couple to one or more accessories.

Another apparatus for a creative stand includes a front panel with two front slots along opposite edges of the front panel. The front panel includes a hole near each corner of the front panel. The apparatus includes a back panel with two back slots along opposite edges of the back panel. The back panel includes a hole near each corner of the back panel. The front slots and back slots align and the holes in the corners of the front and back panels align. The apparatus includes a plurality of openings positioned along the edges of the front and back panels without the front and back slots. The openings are configured to accommodate connectors for accessories. The apparatus includes a side panel sized to fold into a gap between the front panel and the back panel. The side panel includes a hole near each corner of the side panel. The apparatus includes a pivot coupling positioned in a hole of the side panel. The pivot coupling is slidably coupled to a pair of aligned front and the back slots of the two of front and back slots. The corner of the side panel slidably moves along the pair of aligned front and back slots via the pivot coupling, and the side panel is movable from a stowed position in the gap to an open position to the side of the front and back panels by rotating the side panel and moving the pivot coupling along the pair of aligned front and back slots.

In some embodiments, each hole in the front and back panels is in line with slots of the plurality of slots to either side of the hole, and the apparatus includes at least two anchor couplings. Each anchor coupling is positioned through a pair of holes in the front and back panels and extending through the front and back panels. The apparatus, in the embodiments, includes a pair of anchor slots near each corner of the side panel. For a corner of the side panel, a line intersecting a first anchor slot of a pair of anchor slots at the corner and the hole near the corner is orthogonal to a line intersecting a second anchor slot of the pair of anchor slots at the corner and the hole near the corner. A first anchor slot adjacent to the pivot coupling is configured to slide over an anchor coupling adjacent to the pair of aligned front and back panel with the pivot coupling while the side panel is in the stowed position, and a second anchor slot in an edge of the side panel opposite the edge with the first anchor slot is configured to slide over the anchor coupling adjacent to the pair of aligned front and back panel with the pivot coupling while the side panel is in the open position.

In further embodiments, the apparatus includes a panel lock positioned to engage a third anchor slot in the side panel when the side panel is in the stowed position. The third anchor slot is located near a corner of the side panel different from the corner near the pivot coupling. The panel lock is movable between a locked position engaging the third anchor slot and an unlocked position disengaging the third anchor slot. In other embodiments, the front panel includes a planar surface facing away from the gap and the side panel includes a planar surface facing a same direction as the planar surface of the front panel. In other embodiments, the apparatus includes a cell phone holder coupled to a side of the apparatus opposite the front and back slots where the pivot coupling is engaged. The cell phone holder is detachably couplable to a cell phone. In other embodiments, the apparatus includes a foldable back stand coupled to the back panel. The back stand is movable between a stowed position against the back panel and an open position configured to support the apparatus in an upright position. In other embodiments, the apparatus include a steering wheel coupling that is configured to couple the apparatus to a steering wheel.

In other embodiments, the apparatus includes one or more extendable supports positioned along and edge of the front panel adjacent to the edge of the front and back panel with the front and back slots. The extendable supports are operable to move between a closed position where the extendable supports are close to the front panel and an open position where the extendable supports are positioned away from the front panel and are configured to support a device placed on the front panel when the front panel is in an upright position. In other embodiments, the apparatus includes accessory slots on the back panel and straps inserted in the accessory slots. The straps are configured to couple to one or more accessories.

Another apparatus for a creative stand includes a front panel with a front slot along an edge of the front panel, and a back panel fixedly coupled to the front panel, where the back panel includes a back slot along an edge of the back panel. The front slot and back slot align. The apparatus includes a side panel configured to fold into a gap between the front panel and the back panel. The apparatus includes a pivot coupling at a corner of the side panel. The pivot coupling is slidably coupled to the front and the back slots. The corner of the side panel slidably moves along the front and back slots via the pivot coupling and the side panel is movable from a stowed position in the gap to an open position to the side of the front and back panels by rotating the side panel and moving the pivot coupling along the front and back slots. The apparatus includes at least two anchor couplings extending through the front and back panels. Each anchor coupling is positioned near a corner of the front and back panels. At least one anchor coupling of the at least two anchor couplings is positioned at an end of and in line with the front and back slots. The apparatus includes a first anchor slot positioned near a corner of the side panel with the pivot coupling. The first anchor slot is configured to slide over the anchor coupling while the side panel is in the stowed position. The apparatus includes a second anchor slot positioned in an edge of the side panel opposite the edge of the side panel with the pivot coupling. The second anchor slot is configured to slide over the anchor coupling and to fix the side panel with respect to the front and back panels when the side panel is in the open position.

Figure 2:
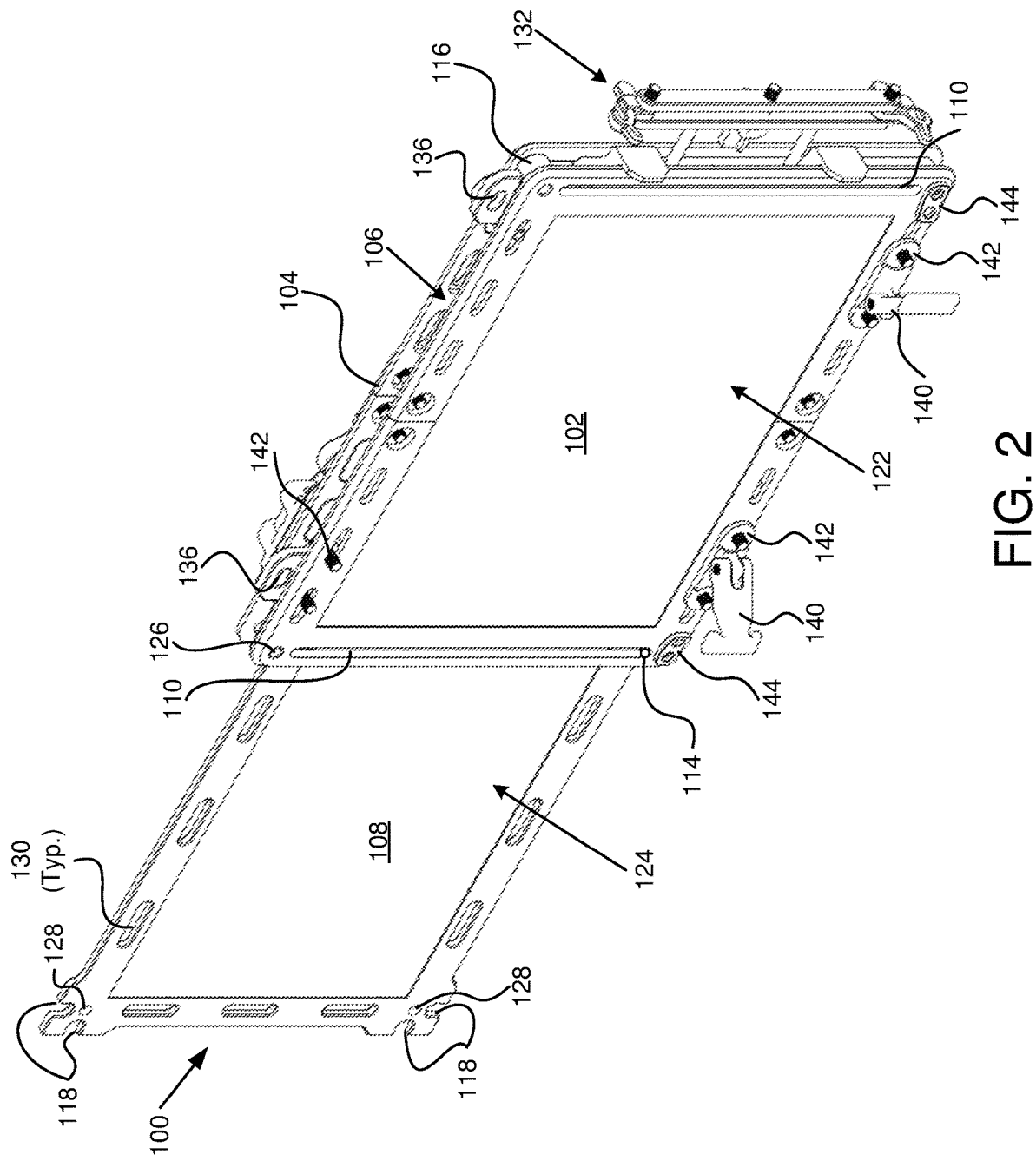
FIG. 2 is a perspective view further illustrating the embodiment of the creative stand of FIG. 1 with the side panel extended.
Figure 3:
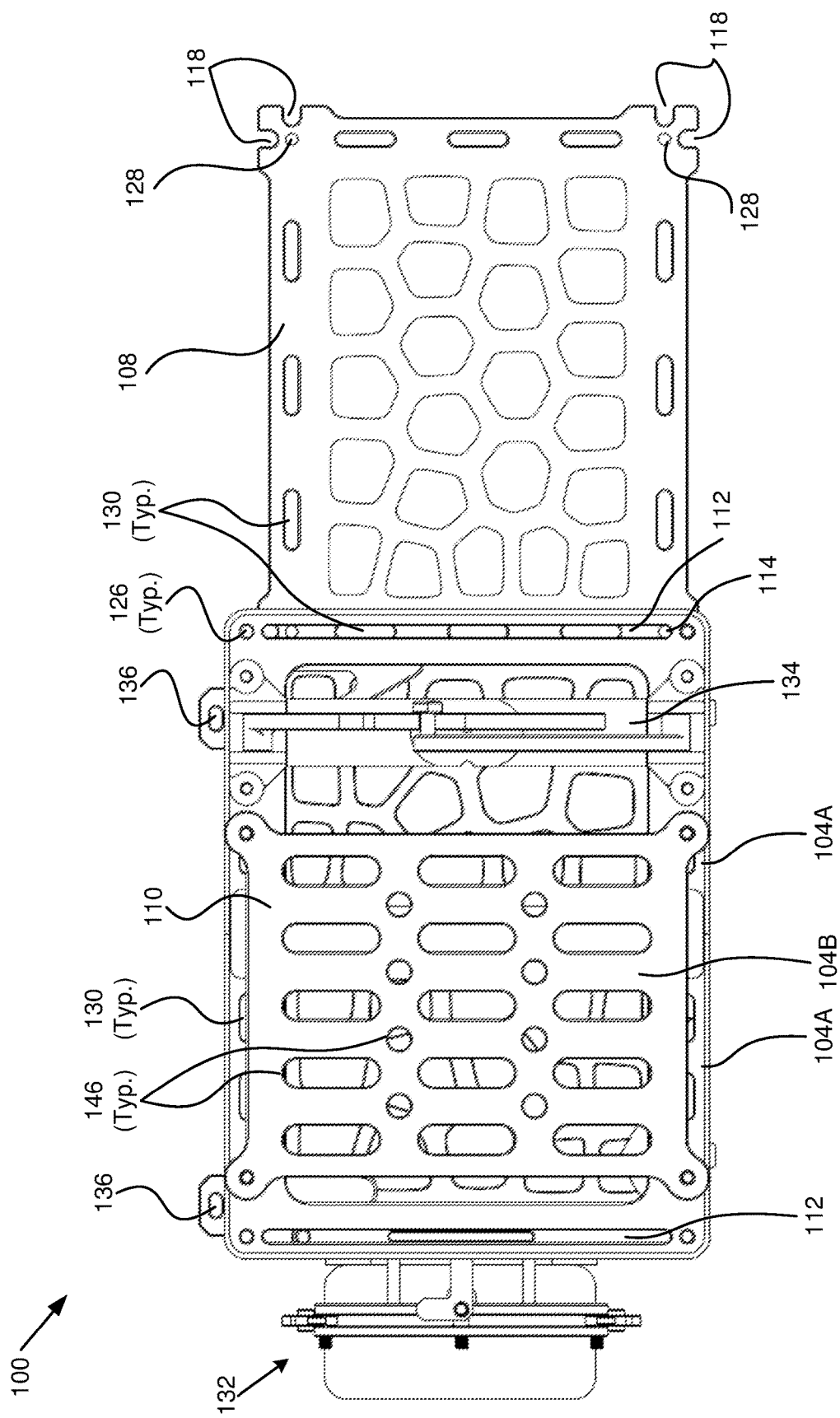
FIG. 3 is a back view further illustrating the embodiment of the creative stand of the creative stand of FIG. 1 with the side panel extended.
Figure 4:
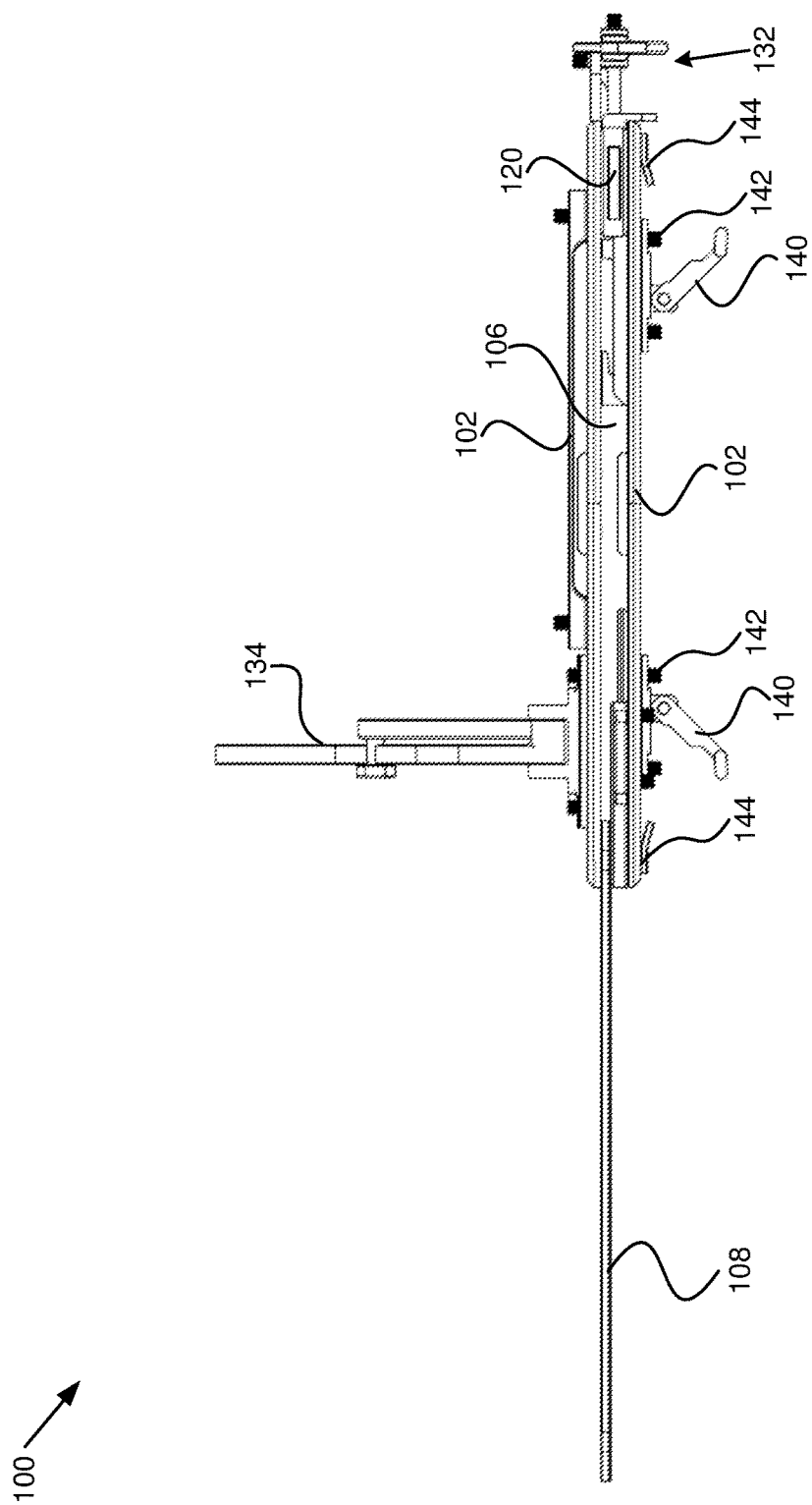
FIG. 4 is a top view further illustrating the embodiment of the creative stand of the creative stand of FIG. 1 with the side panel extended and a foldable back stand extended.
Figure 5:
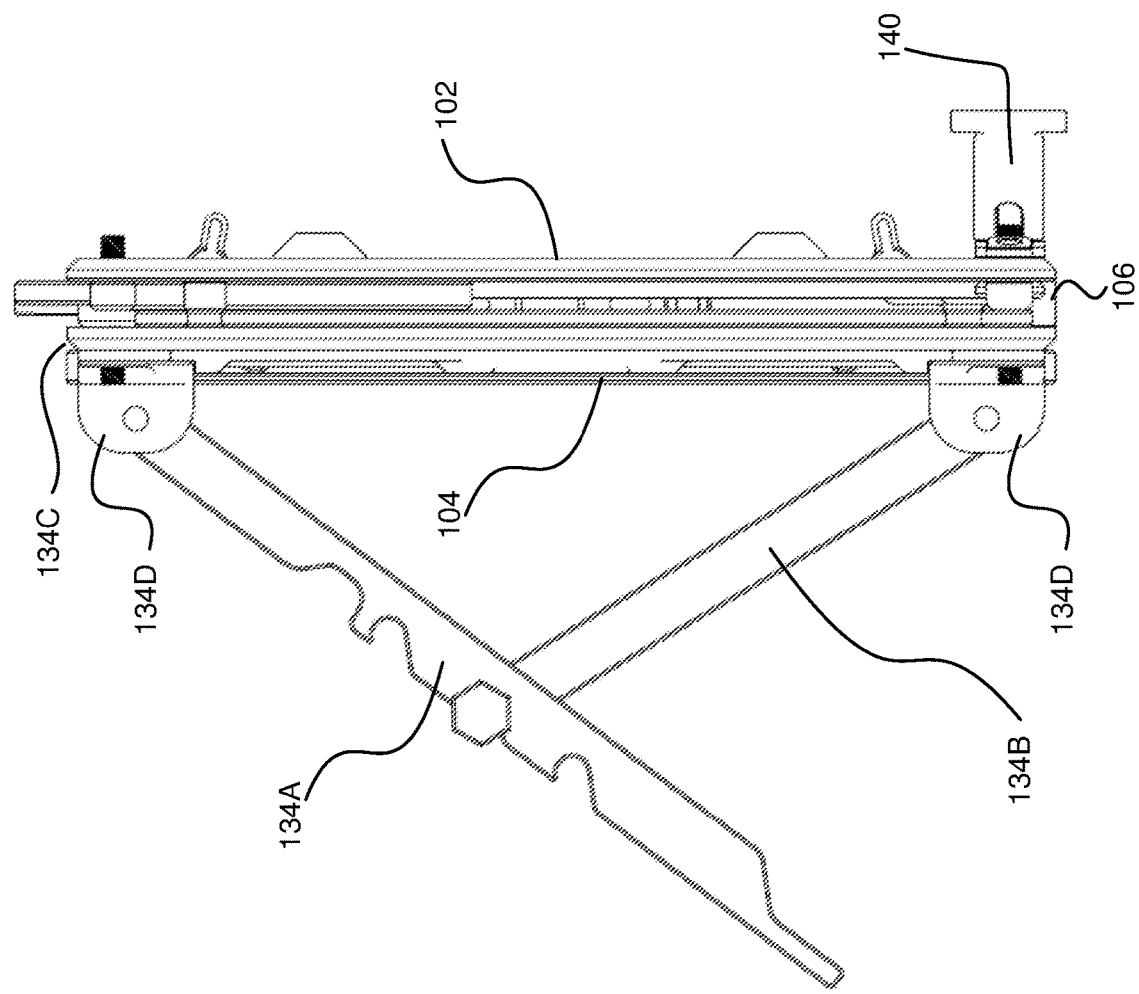
FIG. 5 is a side view illustrating the embodiment of the creative stand of the creative stand of FIG. 1 with the side panel extended and a foldable back stand extended.
Figure 6:
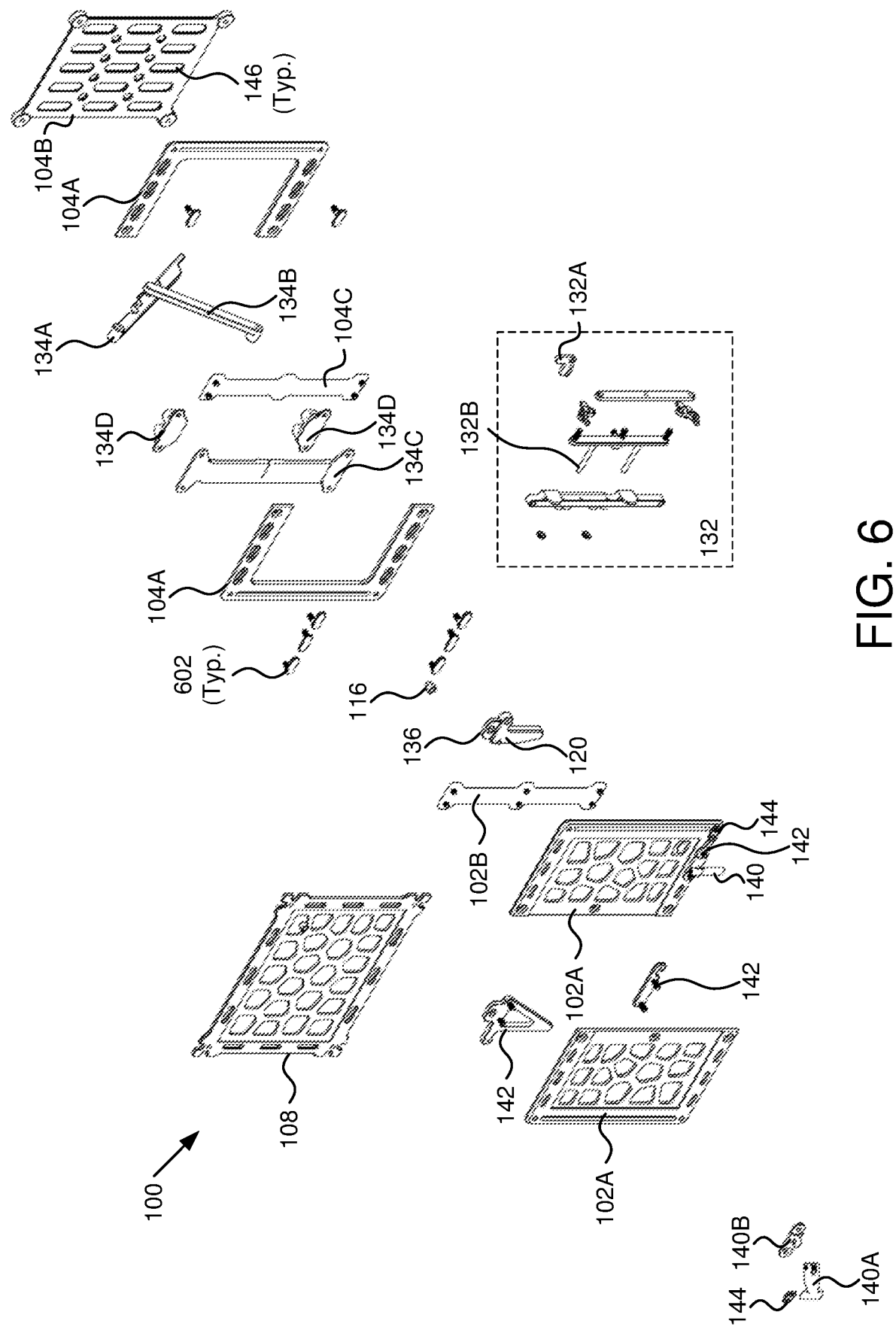
FIG. 6 is an exploded view illustrating the embodiment of the creative stand of the creative stand of FIG. 1.

FIG. 1 is a front view illustrating one embodiment of a creative stand 100 with a side panel 108 extended. FIG. 2 is a perspective view of the creative stand of FIG. 1. FIG. 3 is a back view of the creative stand of FIG. 1. FIG. 4 is a top view of the creative stand of FIG. 1 and includes a foldable back stand 134 in an extended position. FIG. 5 is a side view of the creative stand of FIG. 1 with the foldable back stand 134 in the extended position. FIG. 6 is an exploded view of the creative stand of FIG. 1. The creative stand 100 includes a front panel 102, a back panel 104, a gap 106, the side panel 108, front slots 110, a pivot coupling 114, which are described below.

The creative stand 100 (e.g. "stand 100") includes a front panel 102 with a front slot 110 along an edge of the front panel 102. In the embodiments, depicted, the front panel 102 includes front slots 110 along the left and right edges. The stand 100 includes a back panel 104 fixedly coupled to the front panel 102. The back panel 104 includes a back slot 112 along an edge of the back panel 104. The front slots 110 and the back slots align. As depicted, the front slots 110 and back slots 112 run vertically near the left and right edges of the front panel 102 and back panel 104.

The stand 100 includes a side panel 108 configured to fold into a gap 106 between the front panel 102 and the back panel 104. A pivot coupling 114 is located at a corner of the side panel 108. The pivot coupling 114 is slidably coupled to the front and the back slots 110, 112. For example, the pivot coupling 114 is coupled to a side panel corner hole 128 and includes extensions through the front and back slots 110, 112 so that the pivot coupling 114 slides up and down in the front and back slots 110, 112 and allows the corner of the side panel 108 with the pivot coupling 114 to slidably move along the front and back slots 110, 112 via the pivot coupling 114. The side panel 108 is movable from a stowed position in the gap 106 to an open position to the side of the front and back panels 102, 104 by rotating the side panel 108 and moving the pivot coupling 114 along the front and back slots 110, 112. Movement of the side panel 108 from the open position to the stowed position is described further in relation FIGS. 8-12.

The front panel 102, in some embodiments, includes a planar surface. In other embodiments, the side panel 108 includes a planar surface and the planar surface of the front panel 102 and the side panel 108 face a same direction. For example, the planar surfaces may be on a front of the front panel 102 and side panel 108 away from the back panel 104. In some embodiments, the front panel 102 and/or side panel 108 includes a writing surface 124 that is suitable for writing. For example, a user may place paper, a notebook, etc. on the writing surface 124 and the writing surface 124 is smooth enough for writing. In other embodiments, the writing surface 124 is a dry erase writing surface. In some embodiments, the writing surface 124 configured with a dry erase surface is a pliable sheet attached with adhesive to the front panel 102. In other embodiments, the writing surface 124 is a solid plate attached to the front panel 102.

In some embodiments, the front panel 102 and/or side panel 108 are constructed from a planar material, such as plastic, metal, composite, wood, etc. For example, the front panel 102 and/or side panel 108 may be molded, formed, cut, etc. to form a desired shape. In other embodiments, the front panel 102 and/or side panel 108 may be printed using a 3-dimensional ("3D") printer. In other embodiments, the front panel 102 is constructed out of multiple pieces. For example, the front panel may be made from two front panel side pieces 102A and a front panel support 102B configured to connect the front panel side pieces 102A. One embodiment of two front panel side pieces 102A and a front panel support 102B is depicted in the embodiments describe herein and can be seen in FIGS. 6, 9, and 12. The front panel side pieces 102A, in some embodiments, include holes to reduce cost and weight. The front panel 102, in some embodiments, includes a front panel writing surface 122 that is attachable to the front panel side pieces 102A. For example, the front panel writing surface 122 may be a flexible material that is adhesively coupled to the front panel side pieces 102A. In other embodiments, the front panel writing surface 122 is coupled to the front panel side pieces 102A with another attachment means, such as screws, bolts, etc.

Similarly, the side panel 108, in some embodiments, includes a side panel writing surface 124 connected to the side panel 108, which also may include holes to reduce cost, weight, etc. The side panel 108, in some embodiments, is made of unitary construction. In other embodiments, the side panel 108 is made with multiple parts. In other embodiments, the side panel 108 is formed with a planar surface, which may be suitable for writing. In some embodiments, the side panel 108 is configured to hold a touch screen device, such as a tablet. In other embodiments, the side panel 108 includes a built-in touch screen. For example, the touch screen may include jacks for power and signals. The side panel 108 may be constructed of plastic, composite, wood, metal, or other suitable material. The back panel 104 may also be of unitary construction or may be formed with multiple parts. In embodiments described herein, the back panel 104 includes two back panel frames 104A and a back panel section 104B connected to the back panel frames 104A and also a back panel support 104C connected between the back panel frames 104A. The back panel frames 104A, back panel section 104B, and back panel support 104C are depicted in FIGS. 3, 6, 16 and 17. The back panel 104, in some embodiments, is of unitary construction rather than various parts 104A-C. Again the back panel may be plastic, composite, wood, metal, etc. The components described herein with regard to the stand 100 may include multiple materials.

The stand 100 includes, in some embodiments, an anchor coupling 116 positioned at an end of the front and back slots 110, 112 and extending through the front and back panels 102, 104. The anchor couplings 116, in some embodiments, are configured to maintain the front and back panels 102, 104 at a distance apart to form the gap 106 for the side panel 108. In some embodiments, the anchor couplings 116 are positioned in two or more corners of the front and back panels 102, 104. In other embodiments, anchor couplings 116 are placed in other locations but are outside of a portion of the gap 106 where the side panel 108 fits between the front and back panels 102, 104 and moves from an open position to a stowed position. In various embodiments, the anchor couplings 116 are connected with bolts, screws, adhesive, rivets, or any other material suitable for connecting the anchor couplings 116 to the front and back panels 102, 104. Typically, a corner of the front and back panels 102, 104 adjacent to the front and back slots 110, 112 where the pivot coupling 114 is slidably coupled does not include an anchor coupling 116 to allow the side panel 108 to rotate through the corner and into the gap 106.

Figure 10:
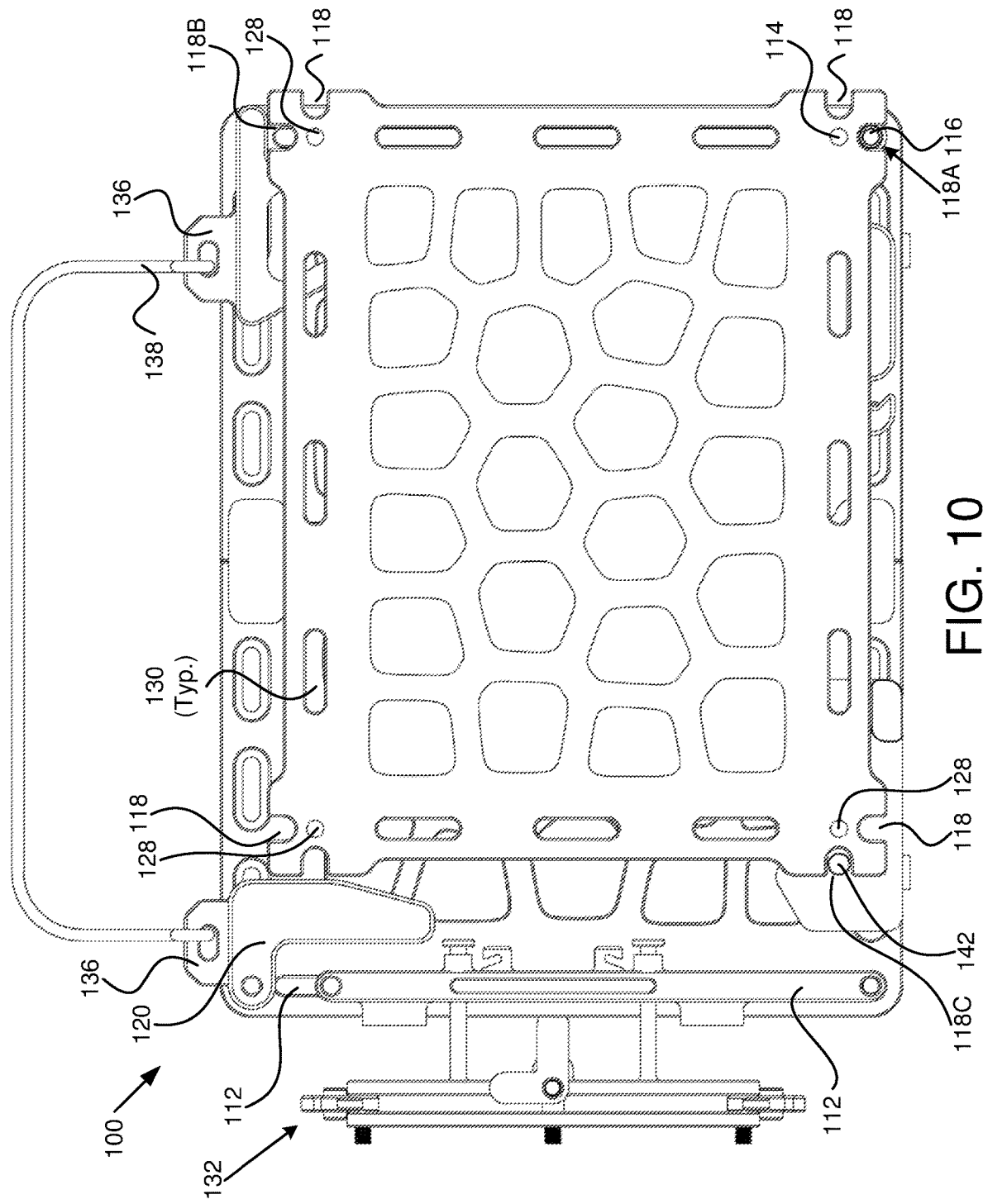
FIG. 10 is a back view further illustrating the embodiment of the creative stand of FIG. 1 with a back panel removed to illustrate the side panel in a stowed position.
Figure 11:
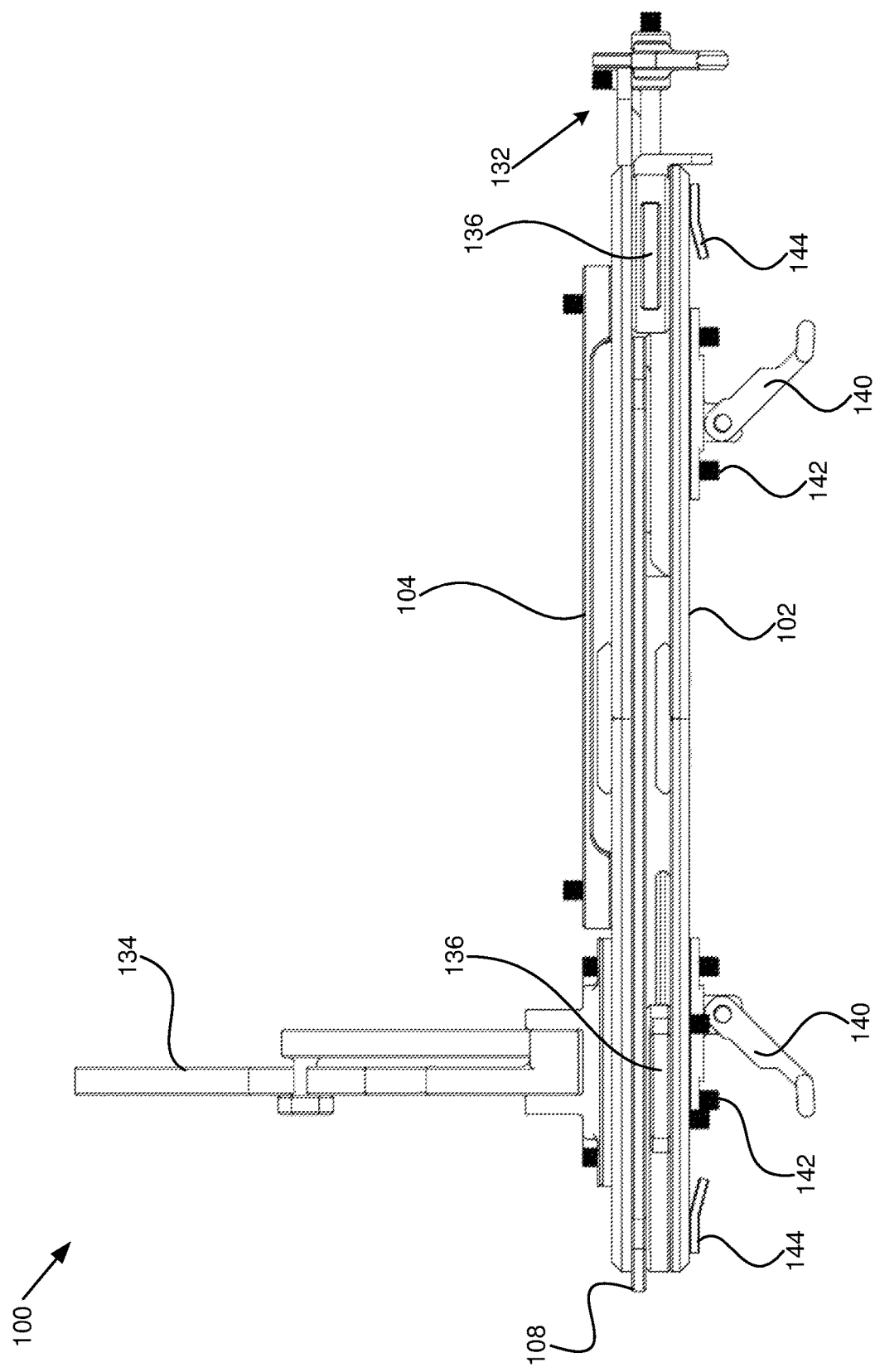
FIG. 11 is a top view further illustrating the embodiment of the creative stand of FIG. 1 with the side panel stowed and the back stand extended.
Figure 12:
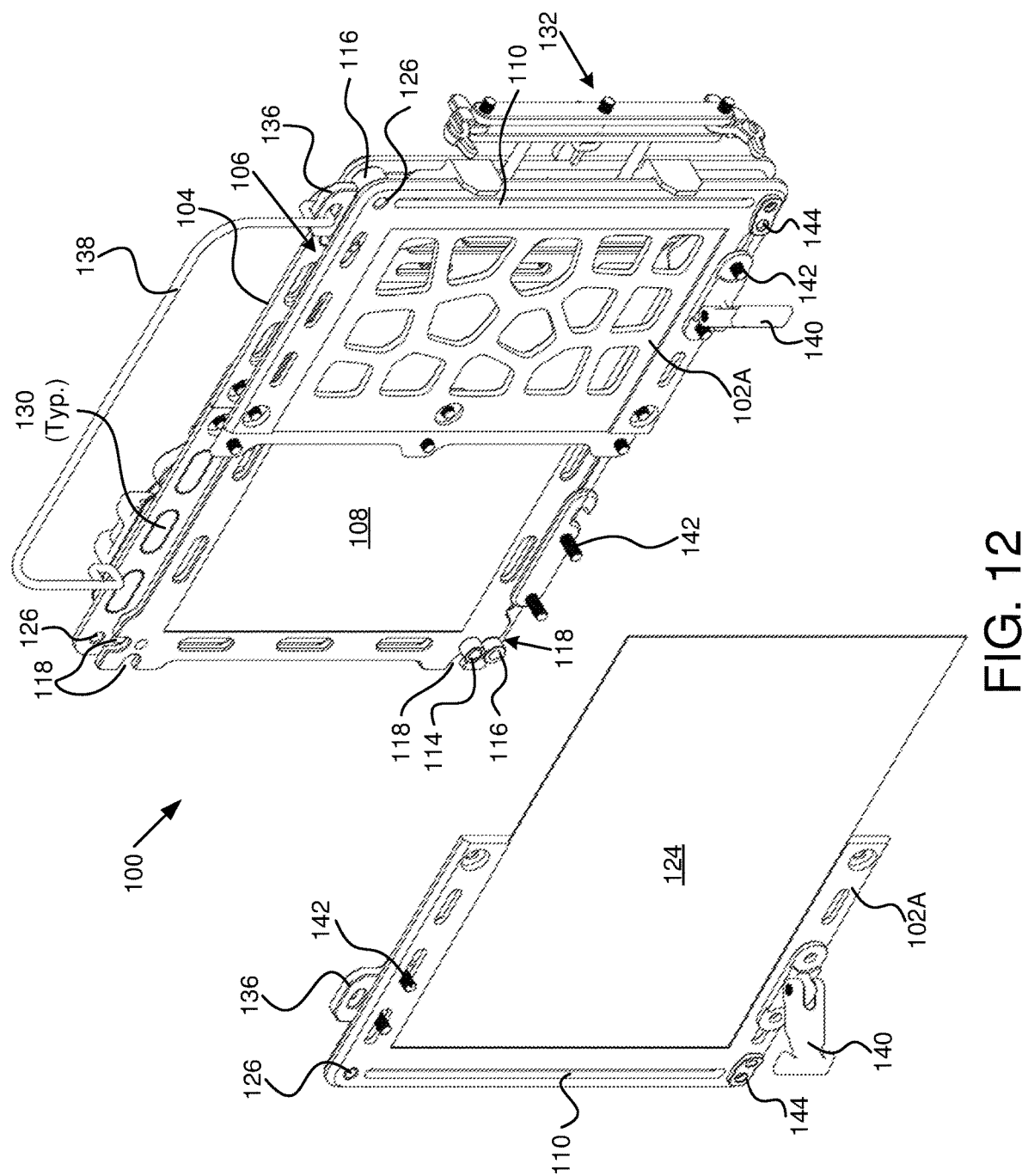
FIG. 12 is a perspective view of the embodiment of the creative stand of FIG. 1 the side panel is depicted in a stowed position with a writing surface and other parts of the front panel are moved away to view the side panel and the handle/steering wheel coupling is depicted.

FIG. 10 is a back view further illustrating the embodiment of the creative stand 100 of FIG. 1 with a back panel 104 removed to illustrate the side panel 108 in a stowed position. In addition, FIG. 11 is a top view further illustrating the embodiment of the creative stand 100 of FIG. 1 with the side panel 108 stowed and the back stand 134 extended and FIG. 12 is a perspective view of the embodiment of the creative stand 100 of FIG. 1 where the side panel 108 is depicted in a stowed position and a writing surface 122 and other parts of the front panel 102 are moved away to view the side panel 108 and the handle/steering wheel coupling 138 is depicted. In some embodiments, the side panel 108 includes a first anchor slot 118 positioned near a corner of the side panel 108 that includes the pivot coupling 114. As depicted in FIG. 10, the first anchor slot 118A is configured to slide over an anchor coupling 116 while the side panel 108 is in the stowed position. As partially depicted in FIG. 17, a second anchor slot 118B positioned near a corner of the side panel 108 opposite of the corner with the pivot coupling 114. FIG. 10 depicts the first anchor slot 118A and the second anchor slot 118B with respect to the pivot coupling 114. The second anchor slot 118B is configured to slide over the same anchor coupling 116 and to fix the side panel 108 with respect to the front and back panels 102, 104 when the side panel is in the open position. In the embodiment, the first anchor slot 118A is in a first edge of the side panel 108 and the second anchor slot 118B is in a second edge of the side panel 108 opposite to the first edge.

Figure 9:
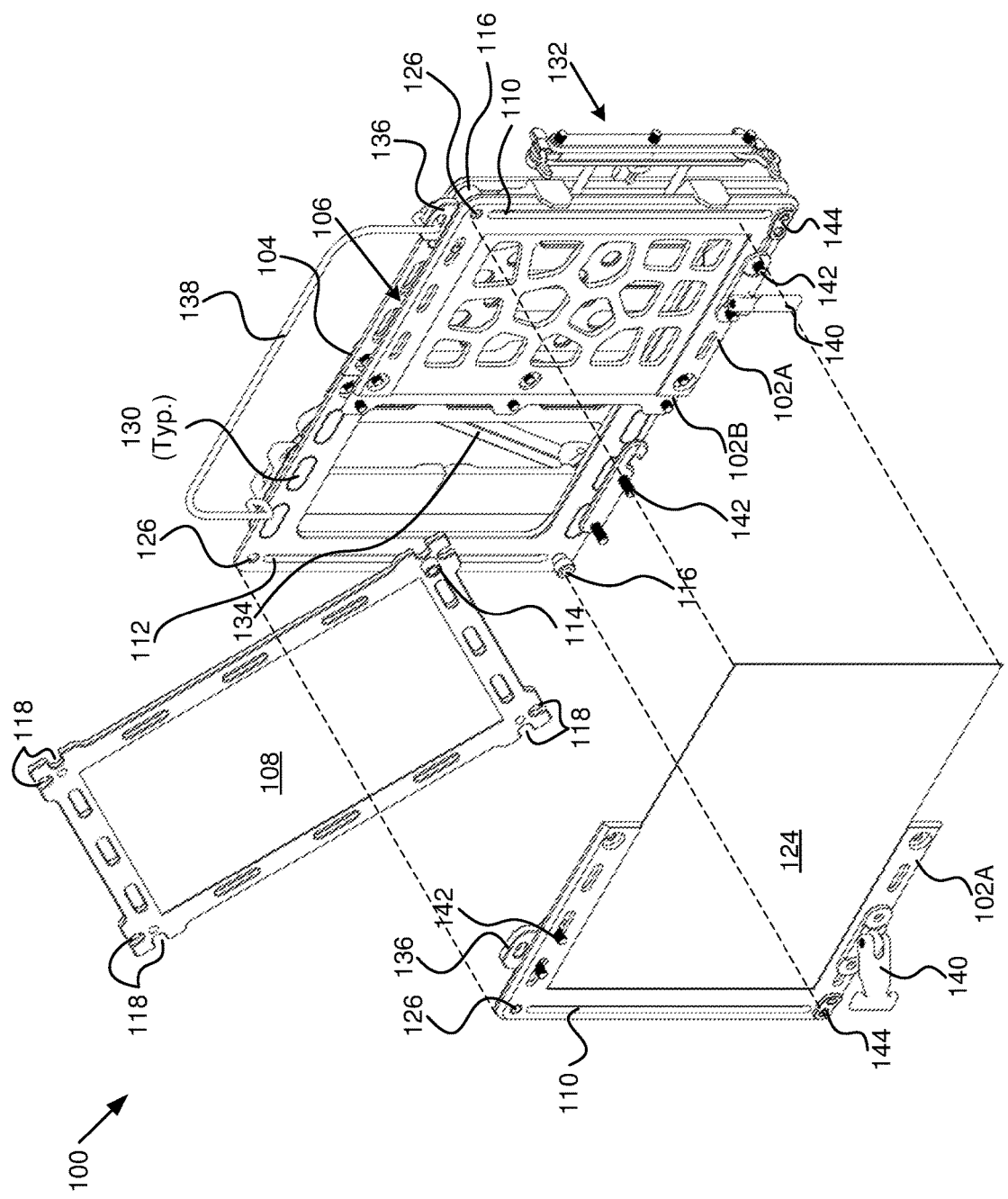
FIG. 9 is a perspective view of the embodiment of the creative stand of FIG. 1 the side panel is depicted rotated further with a writing surface and other parts of the front panel are moved away to view the side panel and a handle/steering wheel coupling is depicted.

The side panel 108 is operable to move between the open position and stowed position by sliding the pivot coupling 114 up and down the front and back slots 110, 112. FIGS. 1-4, 7, 15, and 17 depict the side panel 108 in the open position. While in the open position, the pivot coupling 114 is at a top end of the front and back slots 110, 112 opposite an anchor coupling 116 located at the end of the front and back slots 110. To move the side panel 108 to a stowed position, where anchor slots 118 are present in the side panel 108, the side panel 108 is first moved up to disengage the second anchor slot 118B from the anchor coupling 116, The side panel 108 is then rotated toward the gap 106. FIG. 9 depicts the side panel partially rotated and the pivot coupling 114 moved partially along the back slot 112. One front panel side piece 102A and the front panel writing surface 124 are depicted moved away from the rest of the stand 100 to show the pivot coupling 114 in the back slot 112. Dashed lines indicate where the front panel side piece 102A and front panel writing surface 124 fit. When the front panel side piece 102A depicted as moved away are returned to the stand 100, the pivot coupling 114 fits also in the front slot 110.

Figure 8:
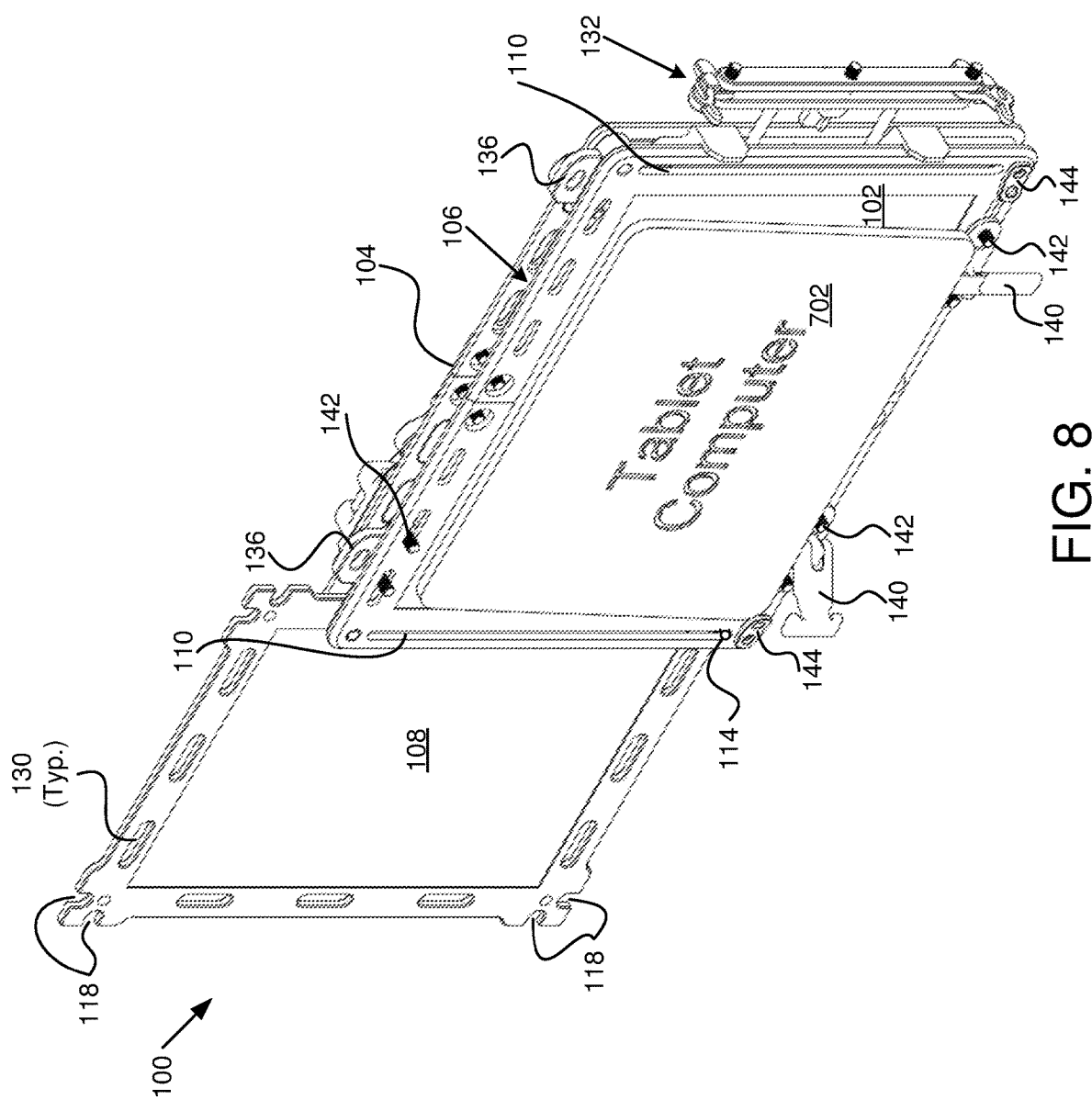
FIG. 8 is a perspective view further illustrating the embodiment of the creative stand of FIG. 1 with the side panel partially rotated toward a stowed position.

FIG. 8 depicts the side panel 108 rotated 90 degrees from the open position where the pivot coupling 114 is at the bottom of the front and back slots 110, 112. In some embodiments, the side panel 108 as depicted in FIG. 8 is in a portrait position and an anchor slot 108 of the side panel 108 may fit over an anchor coupling 116 to maintain the side panel 108 in this portrait position. FIG. 10 depicts the side panel 108 in the stowed position. In FIG. 10, the back panel 104 is removed to show how the side panel 108 fits in the stowed position. As the side panel 108 is rotated into the gap 106, the side panel 108 then slides down so the first anchor slot 118A fits over the anchor coupling 116. The second anchor slot 118B is now at the top of the front and back panels 102, 104 opposite the anchor coupling 116.

FIG. 10 also depicts an embodiment with a panel lock 142 engaging a third anchor slot 118C. In some embodiments, the panel lock 142 slides in and out of the third anchor slot 118C to secure the side panel 108 or to free the side panel 108 to move and rotate. In some embodiments, a panel brace 120 is located at a corner of the side panel 108 diagonal from the pivot coupling 114 and is located in the gap 106. The panel brace 120 prevents the side panel 108 from rotating past a position where both the first anchor slot 118A of the side panel 108 and the third anchor slot 118C is positioned to be engaged by the panel lock 142. In some embodiments, the panel brace 120 also prevents over-rotation of the side panel 108 to help the side panel 108 from coming loose with the panel lock 142 engaged. While the panel lock 142 is shown at the bottom left corner in FIG. 10, in other embodiments, the panel lock 142 is located elsewhere, such as in the top left corner or in the top right corner of the side panel 108.

When the panel lock 142 is in the top left corner, where the panel brace 120 is currently shown, the panel brace 120 may be moved. The panel brace 120 may also be shaped differently and/or located in a different position. For example, the panel brace 120 may include a notch shaped to accommodate a corner of the side panel 108. In some embodiments, the panel brace 120 has a width that matches the gap 106. The panel brace 120, in some embodiments, serves to maintain a width of the gap 106 by the panel brace 120 to be the same as the width of the gap 106 in other locations.

The panel lock 142, in some embodiments, is coupled to a spring element, such as an elastic band, a spring, or other element that provides a force toward a locked position and can be slid toward an unlocked position. In other embodiments, the panel lock 142 maintains a position with a friction fit, by moving into a groove, or other method known to those of skill in the art. For example, the panel lock 142 may slide into a panel lock retractor 144 that holds the panel lock 142 in an open position. In other embodiments, the panel lock 142 incorporated with other elements, such as an extendable support 140, a handle/steering wheel coupling 136, or the like.

In some embodiments, the stand 100 is modular and is configured to be assembled in different ways. In some embodiments, the front and back panels 102, 104 include front and back panel corner holes 126 in each corner shaped to accommodate an anchor coupling 116. The anchor couplings 116, in the embodiments, detachably couple two or more hole pairs of the front and back panels 102, 104. The anchor couplings 116 maintain the gap 106 between the front and back panels 102, 104. Additionally, the side panel 108 includes side panel corner holes 128 in each corner of the side panel 108 where each side panel corner hole 128 is configured to couple to a pivot coupling 114.

The front and back panels 102, 104, in some embodiments, includes front and back slots 110, 112 in at least opposite edges of the front and back panels 102, 104 and in other embodiments, includes front and back slots 110, 112 in all edges of the front and back panels 102, 104. The front and back slots 110, 112 are each configured to couple to a pivot coupling 114. Thus, the front panel 102, back panel 104 and side panel 108 are reconfigurable to position the side panel 108 on either side of the front and back panels 102, 104, or in some embodiments, above or below the front and back panels 102, 104. In other embodiments, the side panel 108 is also rotatable to extend to the side as depicted in FIG. 1 or rotated 90 degrees as depicted in FIG. 8 where either position is an open position.

In some embodiments, the side panel 108 includes a pair of anchor slots 118 near each corner. For a corner of the side panel 108, a line intersecting a first anchor slot 118 of a pair of anchor slots 118 at the corner and the side panel corner hole 128 near the corner of the side panel 108 is orthogonal to a line intersecting a second anchor slot 118 of the pair of anchor slots 118 at the corner and the side panel corner hole 128 near the corner. The anchor slots 118 of the side panel 108, for example, are as depicted in FIGS. 1-3, 6-10, 12, 15 and 17. In the embodiments, the pivot coupling 114 is positioned in a hole 128 in the side panel 108 and is slidably coupled to a front slot 110 of the first and second of front slots 110 and the corresponding back slot 112. Also, in some embodiments a first anchor slot 118 of the pair of anchor slots 118 adjacent to the pivot coupling 114 is configured to slide over an anchor coupling 116 adjacent at a location in line with the front and back slots 110, 112 of the two front and back slots 110, 112 where the pivot coupling 114 is positioned while the side panel 108 is in the stowed position. In addition, an anchor slot 118 in an edge opposite the edge with the first anchor slot 118 is configured to slide over the anchor coupling 116 adjacent to the front and back slots 110, 112 where the pivot coupling 114 is positioned while the side panel 108 is in the open position.

Figure 16:
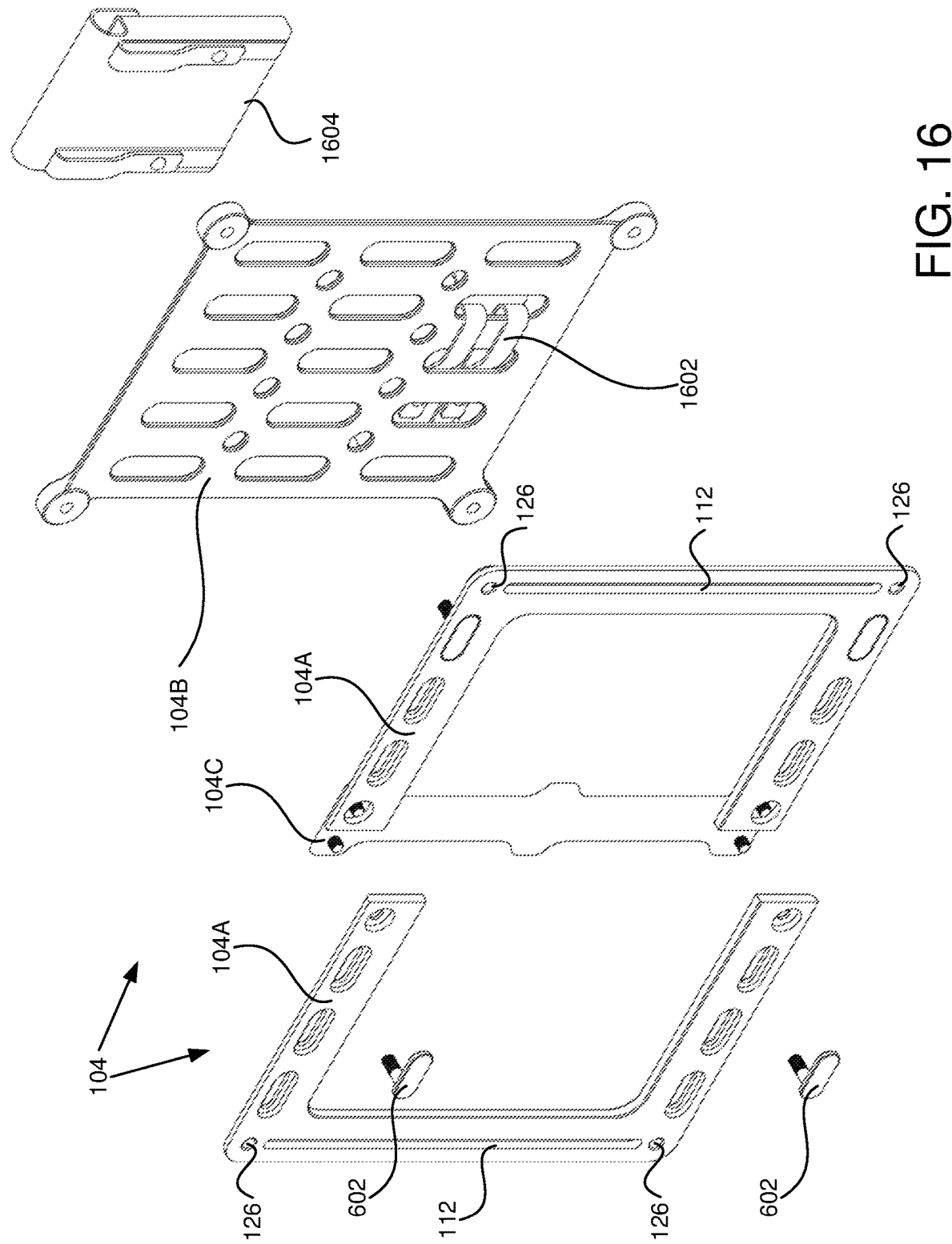
FIG. 16 is an exploded view illustrating another embodiment of the back panel of the embodiment of the creative stand further illustrating accessory slots in an outer cover of the back panel and an accessory pouch.
Figure 17:
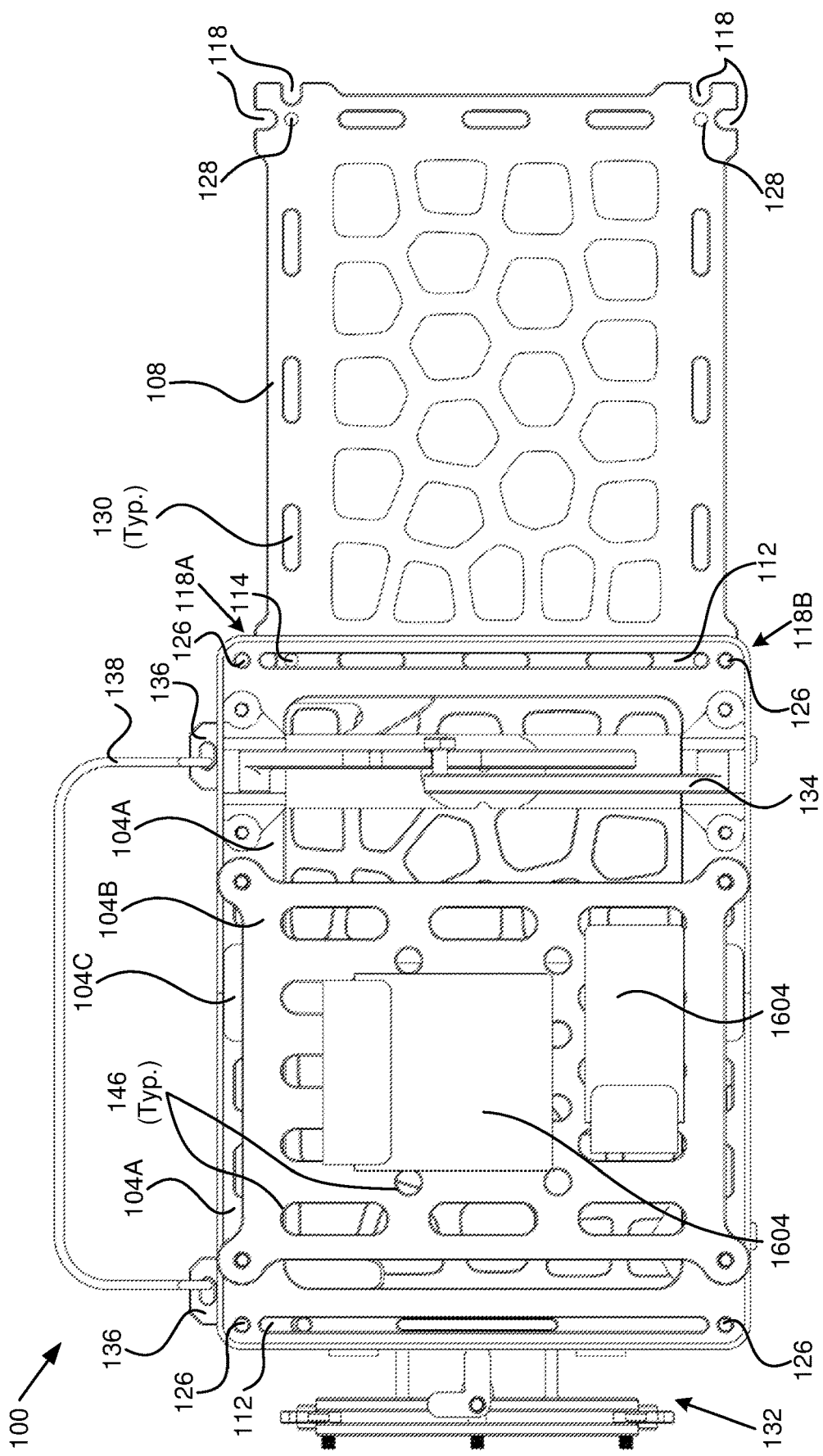
FIG. 17 is a back view illustrating the back panel of FIG. 16 connected to the creative stand and depicting accessory pouches attached to the back panel.

In some embodiments, the stand 100 includes accessory slots 130 positioned adjacent to edges of the front panel 102 and/or back panel 104 without front slots and back slots 110, 112. The accessory slots 130 are configured to couple to additional accessories. For example, a slot filler post 602 may be inserted in an accessory slot 130 where the slot filler post 602 is shaped to fill an accessory slot 130 to prevent rotation and includes a threaded post for attachment of accessories. Slot filler posts 602 are depicted in FIGS. 6 and 16. The slot filler posts 602 depicted in FIG. 16 are positioned to couple to the back panel section 104B. The threaded post of a slot filler post 602 may extend through an opening in the back panel section 104B or other accessory and a nut may then be threaded onto the threaded post. In other embodiments, other connectors are inserted in the accessory slots 130 for connection to various components, accessories, etc. For example, a slot filler post 602 may snap into an accessory or component. One of skill in the art will recognize other ways for a slot filler post 602 to be configured for connection to a component or accessory.

Figure 15:
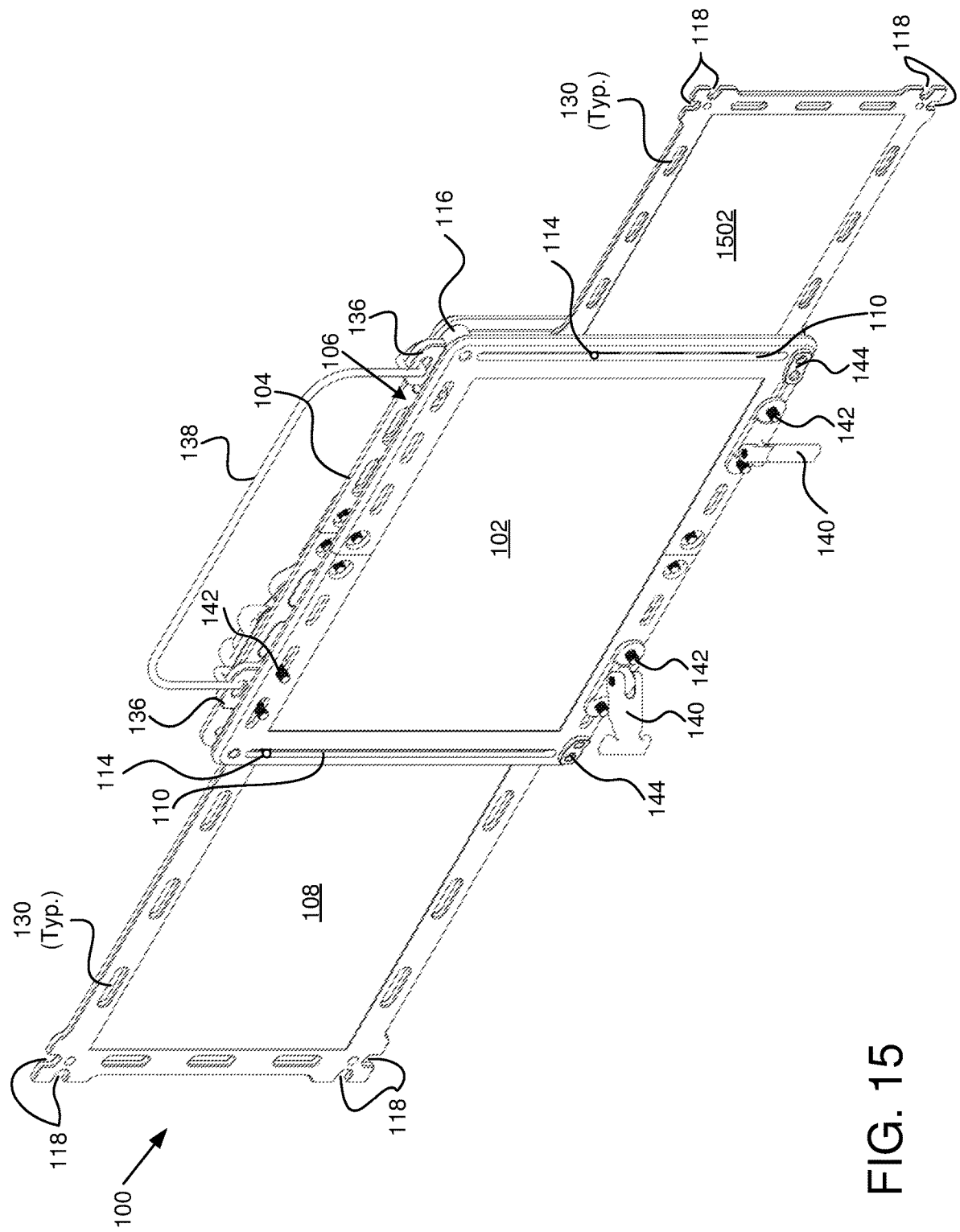
FIG. 15 is a perspective view illustrating another embodiment of the creative stand with two side stands.

In some embodiments, the stand 100 includes a second side panel 1502, as depicted in FIG. 15. In some embodiments, the second side panel 1502 is smaller than the side panel 108 to fit past an anchor coupling 116. The second side panel 1502, in various embodiments, includes a planar surface, a writing surface, a dry erase surface, etc. In some embodiments, the second side panel 1502 fits in the gap 106 so that the side panel 108 and the second side panel 1502 are next to each other in the gap 106. For example, the side panel 108 and second side panel 1502 may include offset pivot couplings 114 to allow the side panel 108 and second side panel 1502 to fit next to each other. In various embodiments, the second side panel 1502 includes side panel corner holes 128, anchor slots 118, etc. like the side panel 108. One of skill in the art will recognize other ways to configure a second side panel 1502.

Figure 14:
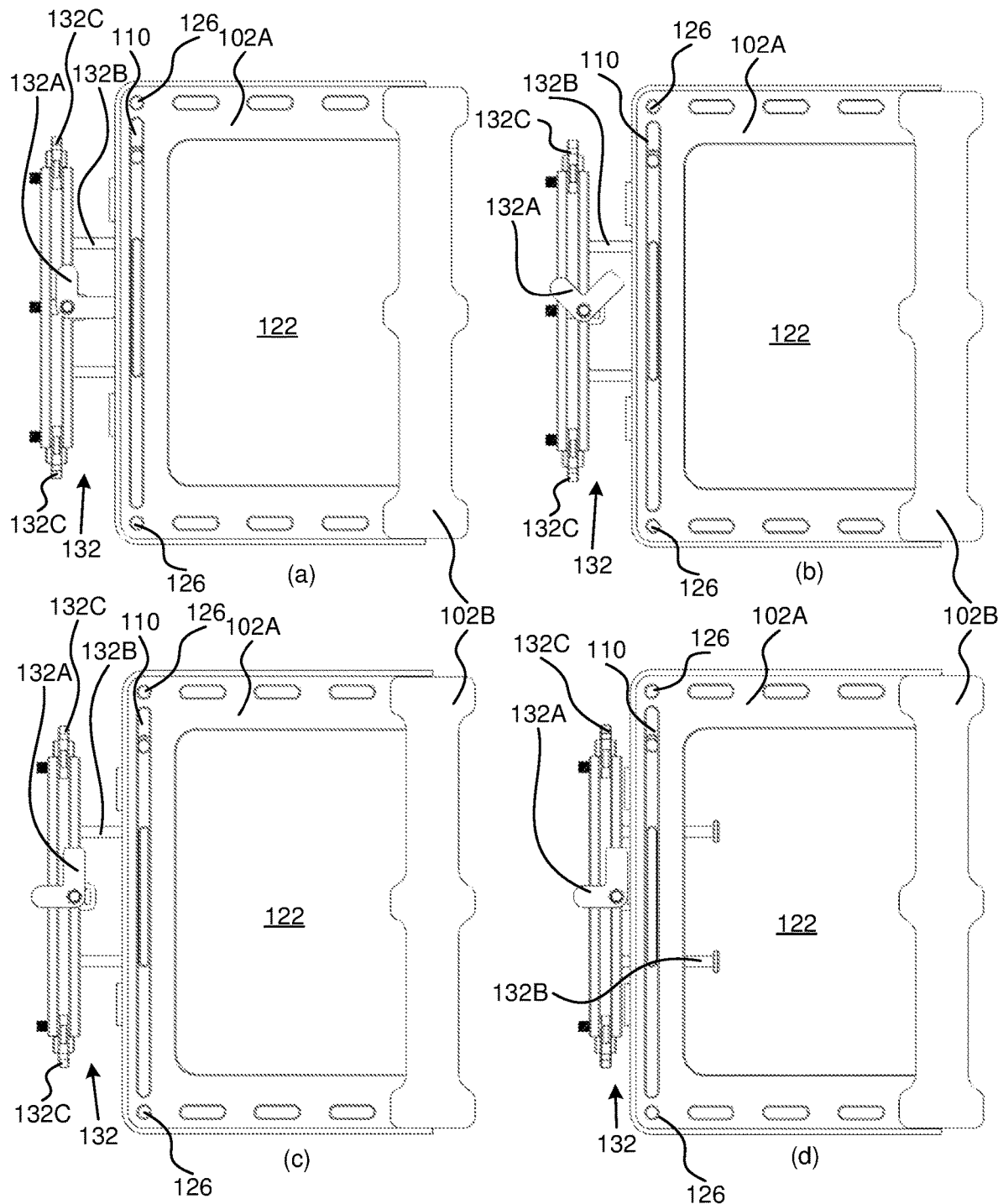
FIG. 14 is a schematic view illustrating a left side of the front panel of the embodiment of the creative stand of FIG. 1 with various stages of operation of cell phone clip.

In some embodiments, the stand 100 includes a cell phone holder 132 coupled to a side of the front and back panels 102, 104 opposite the front and back slots 110, 112 where the pivot coupling 114 is engaged. The cell phone holder 132 is detachably couplable to a cell phone. Operation of one embodiment of a cell phone holder 132 is depicted in FIG. 14. In some embodiments, the cell phone holder 132 attaches to the front and back panels 102, 104 in the front and back slots 110, 112 or in other openings. FIG. 14a depicts the cell phone holder 132 with an extender lock 132A in a locked position, which places the cell phone holder 132 away from the front and back panels 102, 104. Two posts 132B connect the cell phone holder 132 to the front and back panels 102, 104. As the extender lock 132A is rotated, as depicted in FIG. 14b, the cell phone holder 132 is able to move closer to the front and back panels 102, 104. FIG. 14c depicts the extender lock 132A of the cell phone holder 132 in an unlocked position so that the cell phone holder 132 is able to slide toward the front and back panels 102, 104, as depicted in FIG. 14d.

Figure 7:
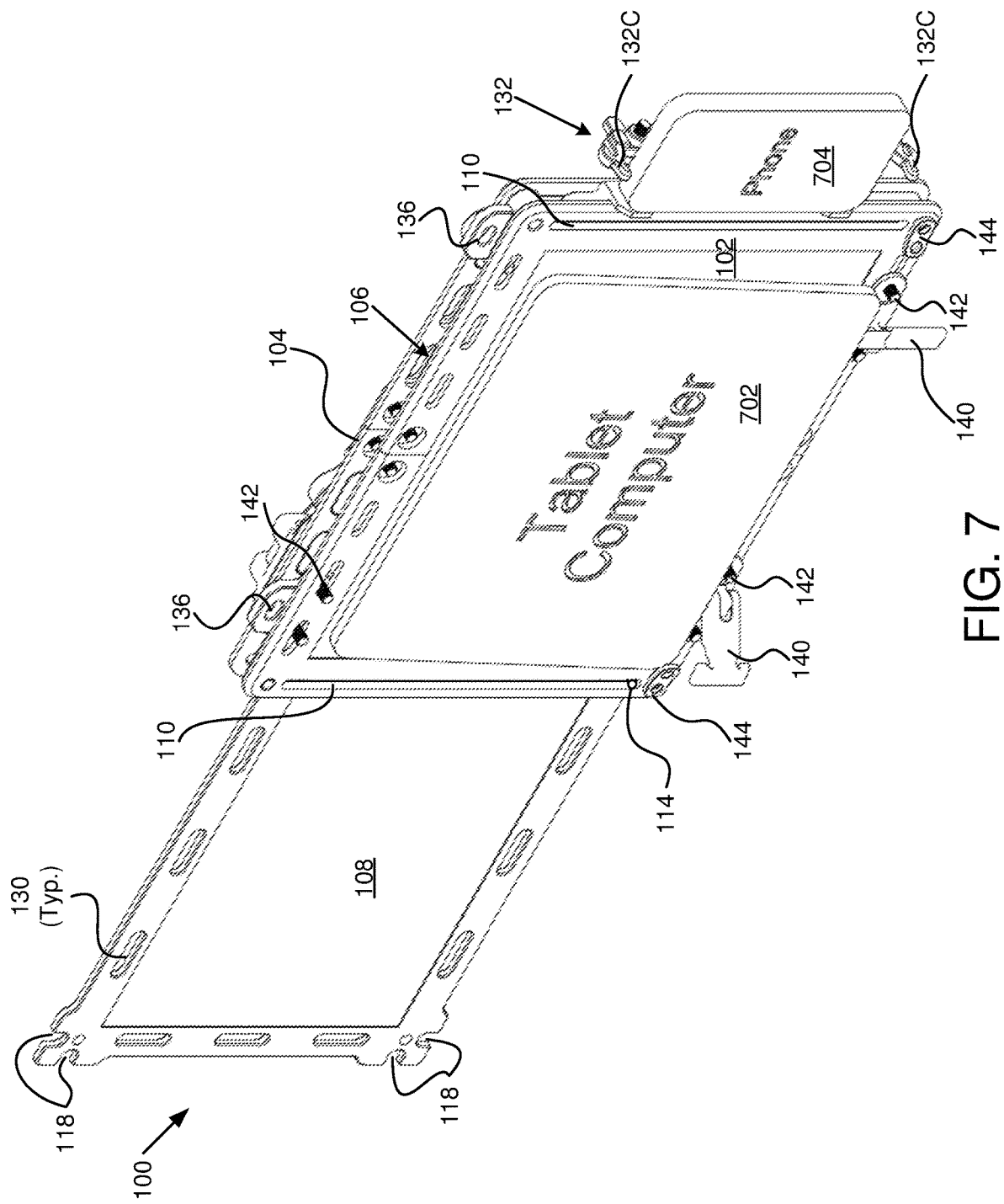
FIG. 7 is a perspective view further illustrating the embodiment of the creative stand of FIG. 1 with the side panel extended with a tablet computer resting on extendable supports coupled to a front panel and a phone attached to a phone clip.

In some embodiments, the posts 132B slide into the gap 106 as the cell phone holder 132 moves toward the front and back panels 102, 104. In some embodiments, the cell phone holder 132 moves without any spring force. In other embodiments, the cell phone holder includes a spring force that pulls the cell phone holder 132 toward the front and back panels 102, 104 and the extender lock 132A counters the spring force. In some embodiments, the cell phone holder 132 includes clips 132C on the top and/or the bottom of the cell phone holder 132 configured to hold a cell phone, as depicted in FIG. 7. One of skill in the art will recognize other configurations of a cell phone holder 132 for use with the stand 100.

In some embodiments, the stand 100 includes a foldable back stand 134 coupled to the back panel 104. The back stand 134, in some embodiments, is movable between a stowed position against the back panel 104 and an open position configured to support the stand 100 in an upright position. One embodiment of a back stand 134 is depicted in FIGS. 3-6, and 11. In the depicted embodiment, the back stand 134 includes a stand leg 134A that is pivotably connected to a top stand connector 134D and includes notches for a bolt, pin, etc. of a stand extender support 134B, which is pivotably connected to a bottom stand connector 134D. A stand panel support 134C connects to the stand connectors 134D. The back stand 134 is configured to extend to support the stand 100 in an upright position when the stand 100 is placed on a horizontal surface. The stand 100, in other embodiments, includes a back stand 134 that has a different configuration.

In some embodiments, the stand 100 includes handle/steering wheel couplings 136 and a handle/steering wheel strap 138. The handle/steering wheel strap 138 is configured to be adjustable to operate as a handle for the stand 100 for carrying the stand 100 or may be adjusted to fit over a steering wheel of a vehicle. The handle/steering wheel couplings 136, in some embodiments, include openings for attaching the handle/steering wheel strap 138. In some embodiments, one or more of the handle/steering wheel couplings 136 are connected to a panel lock 142 so that moving a handle/steering wheel coupling 136 moves the panel lock 142.

Figure 13:
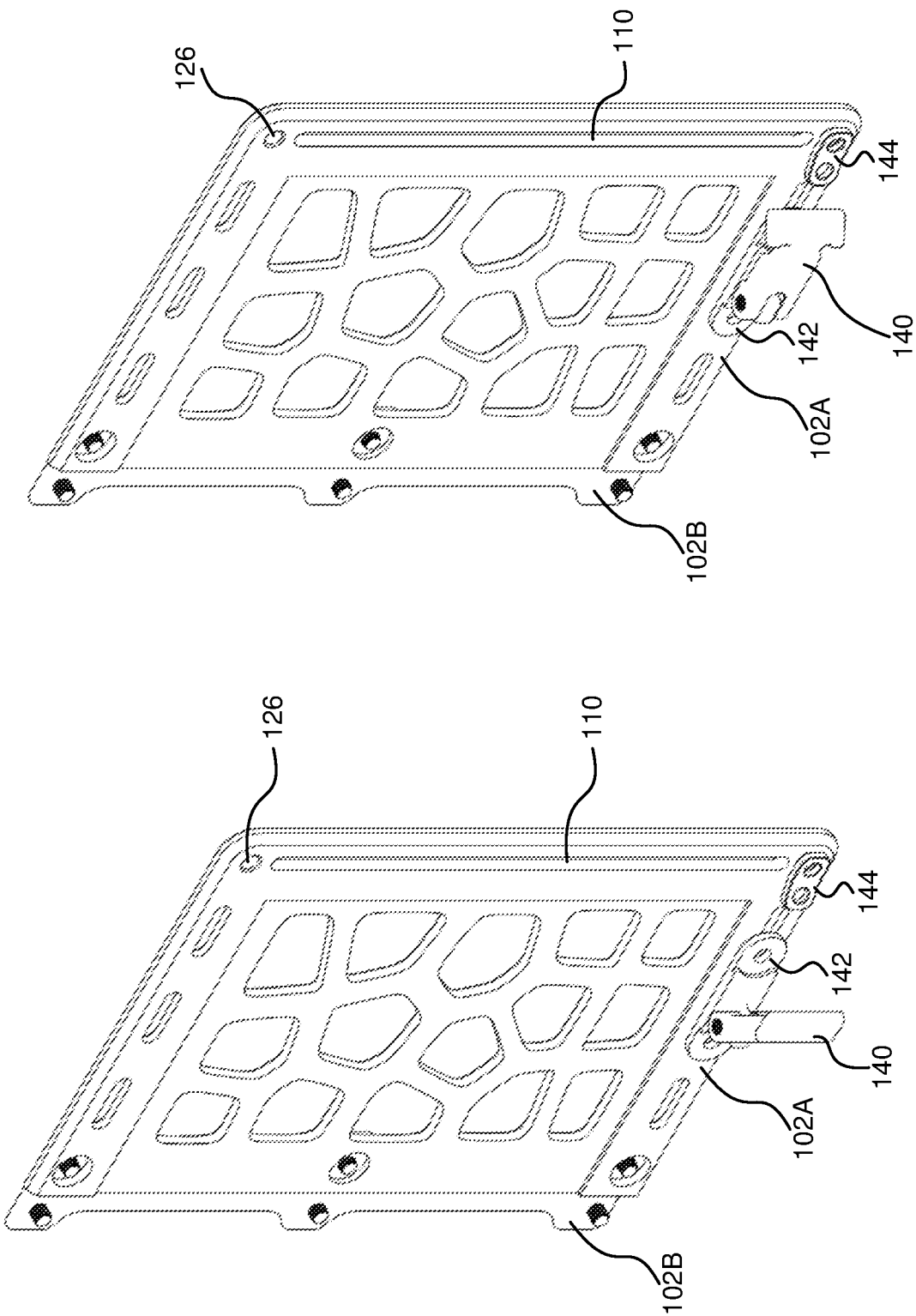
FIG. 13 is a perspective view of one embodiment of the right side of the front panel of the creative stand of FIG. 1 illustrating an extendable support in an extended and closed position.

The stand 100, in some embodiments, includes one or more extendable supports 140 positioned along an edge of the front panel 102 adjacent to the edge of the front and back panel 102, 104 that includes the front and back slots 110, 112. FIG. 13 depicts an extendable support 140 in an open position on the left and a closed position on the right. For example, the one or more extendable supports 140 are positioned on a bottom edge of the front panel 102. In some embodiments, the side panel 108 includes extendable supports 140. In the embodiments, the extendable supports 140 are recessed in the side panel 108 in a closed position or are low profile to fit in the gap 106.

In some embodiments, the extendable supports 140 are operable to move between a closed position where the extendable supports 140 are close to the front panel 102, and an open position where the extendable supports 140 are positioned away from the front panel 102 and are configured to support a device placed on the front panel 102 when the front panel 102 is in an upright position. For example, the extendable supports 140 may be used to support a tablet computer 702, as depicted in FIG. 7, may be used to support a book, a note pad, etc. In some embodiments, the extendable supports 140 each include an arm 140A coupled to a support 140B. In other embodiments, the support 140B of the extendable support 140 is integrated with a panel lock 142. While two extendable supports 140 are depicted herein, additional extendable supports 140 may be included. In other embodiments, the stand 100 includes a support that is fixed rather than extendable.

In some embodiments, the stand 100 includes accessory straps 1602 and accessory pouches 1604. In some embodiments, the accessory straps 1602 are configured to fit in accessory slots/holes 146 of the back panel 104. The accessory slots 146 are depicted as vertical slots spaced regularly to accommodate the accessory straps 1602. In other embodiments, the accessory slots 146 are configured differently. The accessory holes 146 may also be configured to hold accessories. The accessory straps 1602, in some embodiments, are configured similar to a military style strap system on backpacks and other equipment. The accessory straps 1602 are configured to accommodate connection of various accessories, such as an accessory pouch 1604 that includes clips to fit over the accessory straps 1602. The clips may be metal with a spring force, maybe flexible material with a snap, or other connector capable of connecting to the accessory straps 1602.

PARTS LIST

Front panel 102
    Front panel side piece 102A
    Front panel support 102B
Back panel 104
    Back panel frame 104A
    Back panel section 104B
    Back panel support 104C
Gap 106
Side panel 108
Front slot 110
Back slot 112
Pivot coupling 114
Anchor coupling 116
Anchor slot 118
Panel brace 120
Front panel writing surface 122
Side panel writing surface 124
Front panel and back panel corner hole 126
Side panel corner hole 128
Accessory slots 130
Cell phone holder 132
    Extender lock 132A
    Post 132B
Foldable back stand 134
    Stand leg 134A
    Stand extender support 134B
    Stand panel support 134C
    Stand connector 134D
Handle/steering wheel coupling 136
Handle/steering wheel strap 138
Extendable support 140
    Arm 140A
    Support 140B
Panel lock 142
Panel lock retractor 144
Accessory slots/holes 146
Slot filler post 602

Tablet computer 702
Phone 704
Second side panel 1502
Accessory straps 1602
Accessory pouch 1604

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a front panel comprising a front slot along an edge of the front panel;
   a back panel fixedly coupled to the front panel, the back panel comprising a back slot along an edge of the back panel, wherein the front slot and back slot align;
   a side panel configured to fold into a gap between the front panel and the back panel; and
   a pivot coupling at a corner of the side panel, the pivot coupling slidably coupled to the front and the back slots,
   wherein the corner of the side panel slidably moves along the front and back slots via the pivot coupling,
   wherein the side panel is movable from a stowed position in the gap to an open position to the side of the front and back panels by rotating the side panel and moving the pivot coupling along the front and back slots, and
   wherein the side panel is rotatable around the pivot coupling independent from the pivot coupling moving along the front and back slots.

2. The apparatus of claim 1, further comprising:
   an anchor coupling positioned at an end of the front and back slots and extending through the front and back panels;
   a first anchor slot positioned near a corner of the side panel comprising the pivot coupling, the first anchor slot configured to slide over the anchor coupling while the side panel is in the stowed position; and
   a second anchor slot positioned near a corner of the side panel opposite of the corner comprising the pivot coupling, the second anchor slot configured to slide over the anchor coupling and to fix the side panel with respect to the front and back panels when the side panel is in the open position.

3. The apparatus of claim 2, wherein the first anchor slot is in a first edge of the side panel and the second anchor slot is in a second edge of the side panel opposite to the first edge.

4. The apparatus of claim 3, wherein when the side panel is in the open position, the side panel is anchored by the second anchor slot over the anchor coupling and the pivot coupling in the front and back slots at a position opposite an end of the front and back slots near the anchor coupling.

5. The apparatus of claim 2, further comprising a panel lock positioned to engage a third anchor slot in the side panel when the side panel is in the stowed position, the third anchor slot located near a corner of the side panel different from the corner near the pivot coupling, the panel lock movable between a locked position engaging the third anchor slot and an unlocked position disengaging the third anchor slot.

6. The apparatus of claim 5, further comprising a panel brace configured to fit in the gap and to prevent the side panel from moving past a position aligning the third anchor slot with the panel lock.

7. The apparatus of claim 1, wherein the side panel is a first side panel, the front slot is a first front slot, the back slot is a first back slot, and the pivot coupling is a first pivot coupling, and further comprising:
   a second front slot along an edge the front panel opposite the edge of the front panel comprising the first front slot;
   a second back slot along an edge the back panel opposite the edge of the back panel comprising the first back slot, wherein the second front slot and the second back slot align;
   a second side panel configured to fold into the gap between the front panel and the second panel; and
   a second pivot coupling at a corner of the second side panel, the second pivot coupling slidably coupled to the second front slot and the second back slot,
   wherein the corner of the second side panel slidably moves along the second front slot and the second back slot via the second pivot coupling, and
   wherein the second side panel is movable from a stowed position in the gap to an open position to the side of the front and back panels by rotating the second side panel and moving the second pivot coupling along the second front slot and the second back slot.

8. The apparatus of claim 1, wherein the front panel comprises a planar surface facing away from the gap and the side panel comprises a planar surface facing a same direction as the planar surface of the front panel.

9. The apparatus of claim 8, wherein the planar surface of the front panel and/or the planar surface of the back panel comprise a dry erase writing surface.

10. The apparatus of claim 1, wherein the front slot is a first front slot, the back slot is a first back slot, and further comprising:
    a hole through each corner of the front panel;
    a hole through each corner of the back panel, wherein the holes in the front panel align with the holes in the back panel, each forming a hole pair;
    a hole through each corner of the side panel;
    anchor couplings detachably coupling two or more hole pairs of the front and back panels, the anchor couplings maintaining the gap between the front and back panels;
    a second front slot positioned along an edge of the front panel opposite the edge adjacent to the first front slot; and
    a second back slot positioned along an edge of the back panel opposite the edge adjacent to the first back slot, wherein the second front slot aligns with the second back slot,
    wherein the pivot coupling is positionable in any of the holes in the side panel and in any of the aligned front and back slots, and
    wherein the anchor couplings are positionable in any of the hole pairs.

11. The apparatus of claim 10, further comprising:
    a pair of anchor slots near each corner of the side panel, wherein for a corner of the side panel, a line intersecting a first anchor slot of a pair of anchor slots at the corner and the hole near the corner is orthogonal to a line intersecting a second anchor slot of the pair of anchor slots at the corner and the hole near the corner, wherein the pivot coupling is positioned in a hole in the side panel and is slidably coupled to a front slot of the first and second of front slots and the corresponding back slot, wherein a first anchor slot of the pair of anchor slots adjacent to the pivot coupling is configured to slide over an anchor coupling adjacent at a location in line with the front and back slots of the two front and back slots where the pivot coupling is positioned while the side panel is in the stowed position, and wherein an anchor slot in an edge opposite the edge with the first anchor slot is configured to slide over the anchor coupling adjacent to the front and back slots where the pivot coupling is positioned while the side panel is in the open position.

12. The apparatus of claim 10, further comprising a plurality of accessory slots positioned adjacent to edges of the front panel and/or back panel without front slots and back slots, the accessory slots configured to couple to additional accessories.

13. The apparatus of claim 1, further comprising a cell phone holder coupled to a side of the front and back panels opposite the front and back slots where the pivot coupling is engaged, the cell phone holder detachably couplable to a cell phone.

14. The apparatus of claim 1, further comprising one or more of:
a foldable back stand coupled to the back panel, the back stand movable between a stowed position against the back panel and an open position configured to support the apparatus in an upright position;
a handle/steering wheel coupling that is configured to couple the apparatus to a steering wheel;
one or more extendable supports positioned along an edge of the front panel adjacent to the edge of the front and back panel comprising the front and back slots, the extendable supports operable to move between a closed position where the extendable supports are close to the front panel and an open position where the extendable supports are positioned away from the front panel and are configured to support a device placed on the front panel when the front panel is in an upright position; and
accessory slots on the back panel and straps inserted in the accessory slots, the straps configured to couple to one or more accessories.

15. An apparatus comprising:
a front panel comprising two front slots along opposite edges of the front panel, the front panel comprising a hole near each corner of the front panel;
a back panel comprising two back slots along opposite edges of the back panel, the back panel comprising a hole near each corner of the back panel, wherein the front slots and back slots align and the holes in the corners of the front and back panels align;
a plurality of openings positioned along the edges of the front and back panels without the front and back slots, the openings configured to accommodate connectors for accessories;
a side panel sized to fold into a gap between the front panel and the back panel, the side panel comprising a hole near each corner of the side panel; and
a pivot coupling positioned in a hole of the side panel, the pivot coupling slidably coupled to a pair of aligned front and the back slots of the two of front and back slots, wherein the corner of the side panel slidably moves along the pair of aligned front and back slots via the pivot coupling, and
wherein the side panel is movable from a stowed position in the gap to an open position to the side of the front and back panels by rotating the side panel and moving the pivot coupling along the pair of aligned front and back slots.

16. The apparatus of claim 15, wherein each hole in the front and back panels is in line with slots of the plurality of slots to either side of the hole, and further comprising:
at least two anchor couplings, each anchor coupling positioned through a pair of holes in the front and back panels and extending through the front and back panels; and
a pair of anchor slots near each corner of the side panel, wherein for a corner of the side panel, a line intersecting a first anchor slot of a pair of anchor slots at the corner and the hole near the corner is orthogonal to a line intersecting a second anchor slot of the pair of anchor slots at the corner and the hole near the corner,
wherein a first anchor slot adjacent to the pivot coupling is configured to slide over an anchor coupling adjacent to the pair of aligned front and back panel with the pivot coupling while the side panel is in the stowed position, and
wherein a second anchor slot in an edge of the side panel opposite the edge with the first anchor slot is configured to slide over the anchor coupling adjacent to the pair of aligned front and back panel with the pivot coupling while the side panel is in the open position.

17. The apparatus of claim 16, further comprising a panel lock positioned to engage a third anchor slot in the side panel when the side panel is in the stowed position, the third anchor slot located near a corner of the side panel different from the corner near the pivot coupling, the panel lock movable between a locked position engaging the third anchor slot and an unlocked position disengaging the third anchor slot.

18. The apparatus of claim 15, wherein the front panel comprises a planar surface facing away from the gap and the side panel comprises a planar surface facing a same direction as the planar surface of the front panel.

19. The apparatus of claim 15, further comprising one or more of:
a cell phone holder coupled to a side of the apparatus opposite the front and back slots where the pivot coupling is engaged, the cell phone holder detachably couplable to a cell phone;
a foldable back stand coupled to the back panel, the back stand movable between a stowed position against the back panel and an open position configured to support the apparatus in an upright position;
a steering wheel coupling that is configured to couple the apparatus to a steering wheel;
one or more extendable supports positioned along and edge of the front panel adjacent to the edge of the front and back panel comprising the front and back slots, the extendable supports operable to move between a closed position where the extendable supports are close to the front panel and an open position where the extendable supports are positioned away from the front panel and are configured to support a device placed on the front panel when the front panel is in an upright position; and
accessory slots on the back panel and straps inserted in the accessory slots, the straps configured to couple to one or more accessories.

20. An apparatus comprising:
a front panel comprising a front slot along an edge of the front panel;
a back panel fixedly coupled to the front panel, the back panel comprising a back slot along an edge of the back panel, wherein the front slot and back slot align;
a side panel configured to fold into a gap between the front panel and the back panel;
a pivot coupling at a corner of the side panel, the pivot coupling slidably coupled to the front and the back slots, wherein the corner of the side panel slidably moves along the front and back slots via the pivot coupling and wherein the side panel is movable from a stowed position in the gap to an open position to the side of the front and back panels by rotating the side panel and moving the pivot coupling along the front and back slots;
at least two anchor couplings extending through the front and back panels, each anchor coupling positioned near a corner of the front and back panels, wherein at least one anchor coupling of the at least two anchor couplings is positioned at an end of and in line with the front and back slots;
a first anchor slot positioned near a corner of the side panel comprising the pivot coupling, the first anchor slot configured to slide over the anchor coupling while the side panel is in the stowed position; and
a second anchor slot positioned in an edge of the side panel opposite the edge of the side panel comprising the pivot coupling, the second anchor slot configured to slide over the anchor coupling and to fix the side panel with respect to the front and back panels when the side panel is in the open position.

* * * * *